Figure 1C:
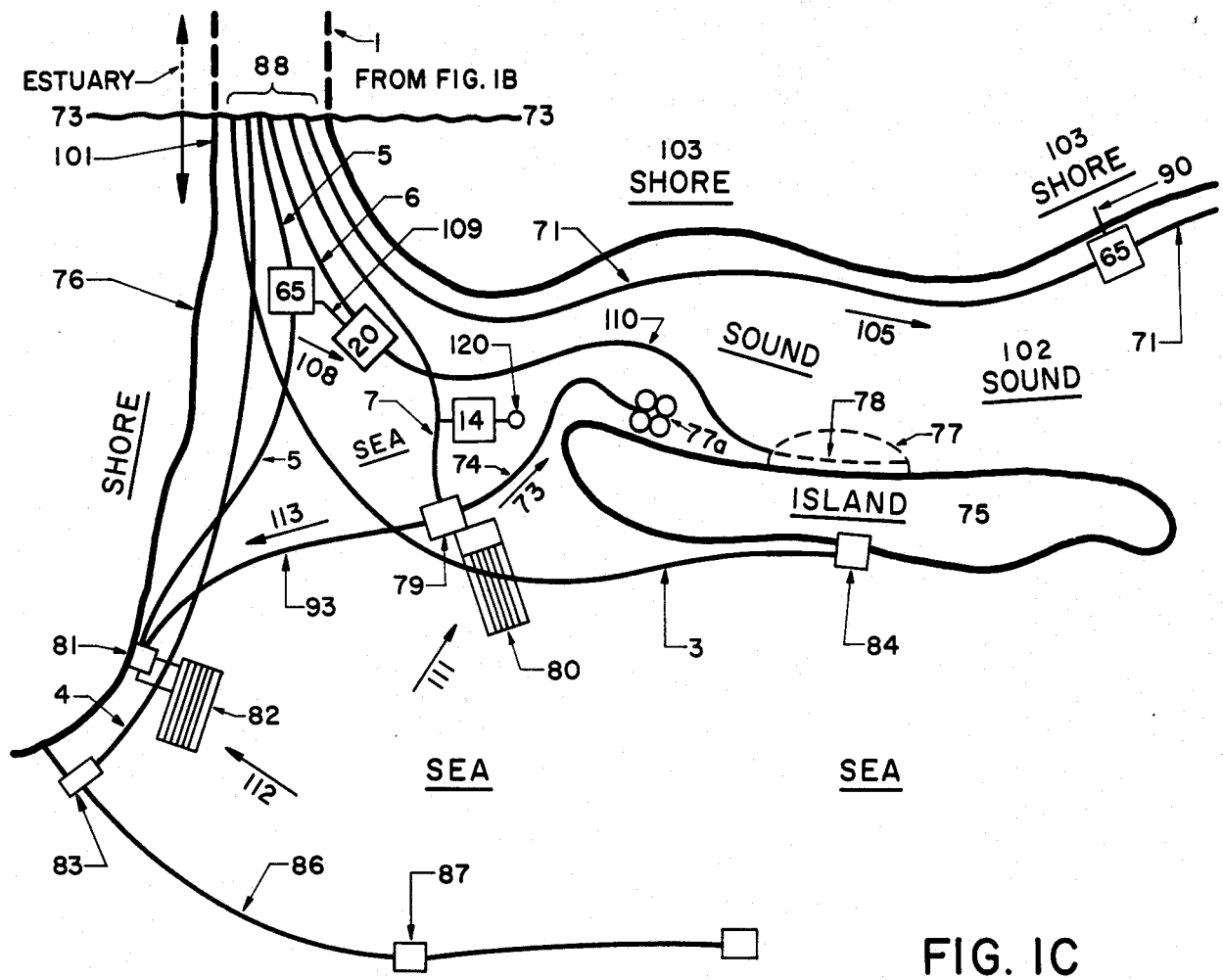

United States Patent [19]

Kantor

[11] Patent Number: 4,618,421
[45] Date of Patent: Oct. 21, 1986

[54] FLUID TRANSPORT AND PROCESSING SYSTEM

[76] Inventor: Frederick W. Kantor, 523 W. 112th St., New York, N.Y. 10025

[21] Appl. No.: 423,522

[22] Filed: Sep. 27, 1982

[51] Int. Cl.$^4$ .............................................. C02C 1/02
[52] U.S. Cl. ............................... 210/170; 137/236.1; 210/919; 210/920
[58] Field of Search .......................... 137/236 R, 205; 210/170, 601, 609, 747, 919, 920; 405/52, 171, 172

[56] References Cited

U.S. PATENT DOCUMENTS

| | | | |
|---|---|---|---|
| 3,375,856 | 4/1968 | Howard et al. | 137/236 X |
| 3,467,013 | 9/1969 | Conner | 405/171 X |
| 3,549,010 | 12/1970 | Marsh | 210/919 X |
| 3,674,687 | 7/1972 | Quase | 210/170 X |
| 3,686,693 | 8/1972 | Liljendahl | 137/205 X |
| 4,076,515 | 2/1978 | Rickard | 210/609 |
| 4,117,683 | 10/1978 | Rasmussen | 405/52 X |
| 4,231,873 | 11/1980 | Swigger | 405/52 X |
| 4,360,427 | 11/1982 | Posgate | 210/170 |
| 4,370,233 | 1/1983 | Hayes et al. | 210/919 X |
| 4,469,596 | 9/1984 | Kantor | 210/137 |

*Primary Examiner*—Richard V. Fisher
*Assistant Examiner*—W. Gary Jones
*Attorney, Agent, or Firm*—Gregor N. Neff

[57] ABSTRACT

One or more thin-wall tubes called "equiducts" are located near or on the bottom of a body of water such as a lake or ocean, or, more typically, in a water artery such as a river or stream. When the tubes are used for waste transport along a river, communities and industrial plants discharge their sewage and other wastes into the tubes at various locations along the river. The liquids in the tubes are in fluid equilibrium with the surrounding water, so that the tube walls can be thin and made of relatively inexpensive materials. The liquids are carried downstream in the tubes by the natural grade of the river bed, and by pumps located at spaced intervals on the river bed. The liquids are conducted to one of several different disposal arrangements. One disposal arrangement is a conventional on-shore processing plant. Another is simply a deep-water disposal site far out into the ocean or a large lake at the end of the river. A third disposal arrangement is a floating or underwater processing plant, either on the bottom of the river, ocean or lake, or floating on the surface of such a body of water. Alternatively, the wastes can be processed in transit in the tubes. Preferably, separate tubes are provided for different wastes so that each can be treated by the process most effective for the type of waste involved.

7 Claims, 4 Drawing Figures

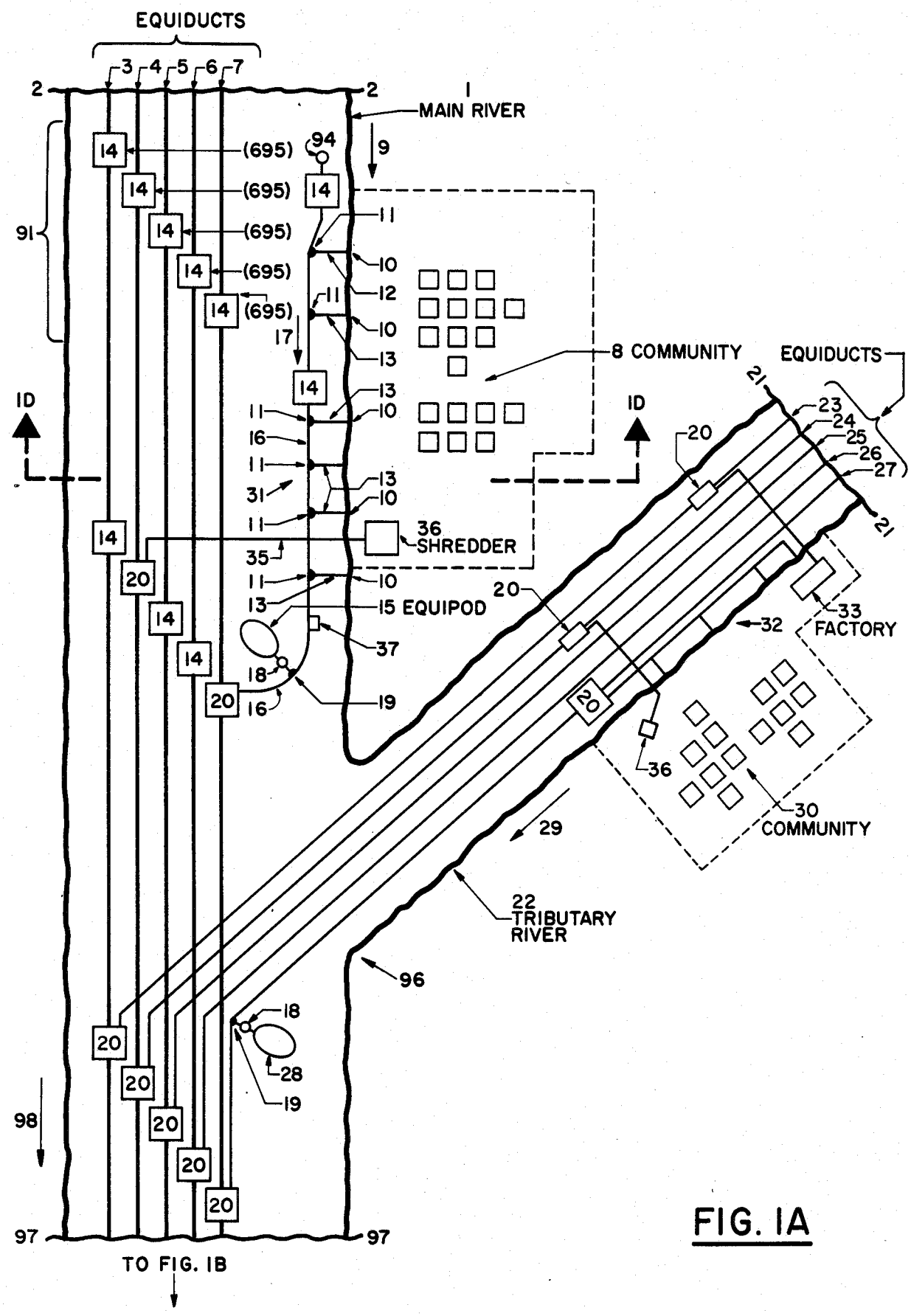
FIG. IA

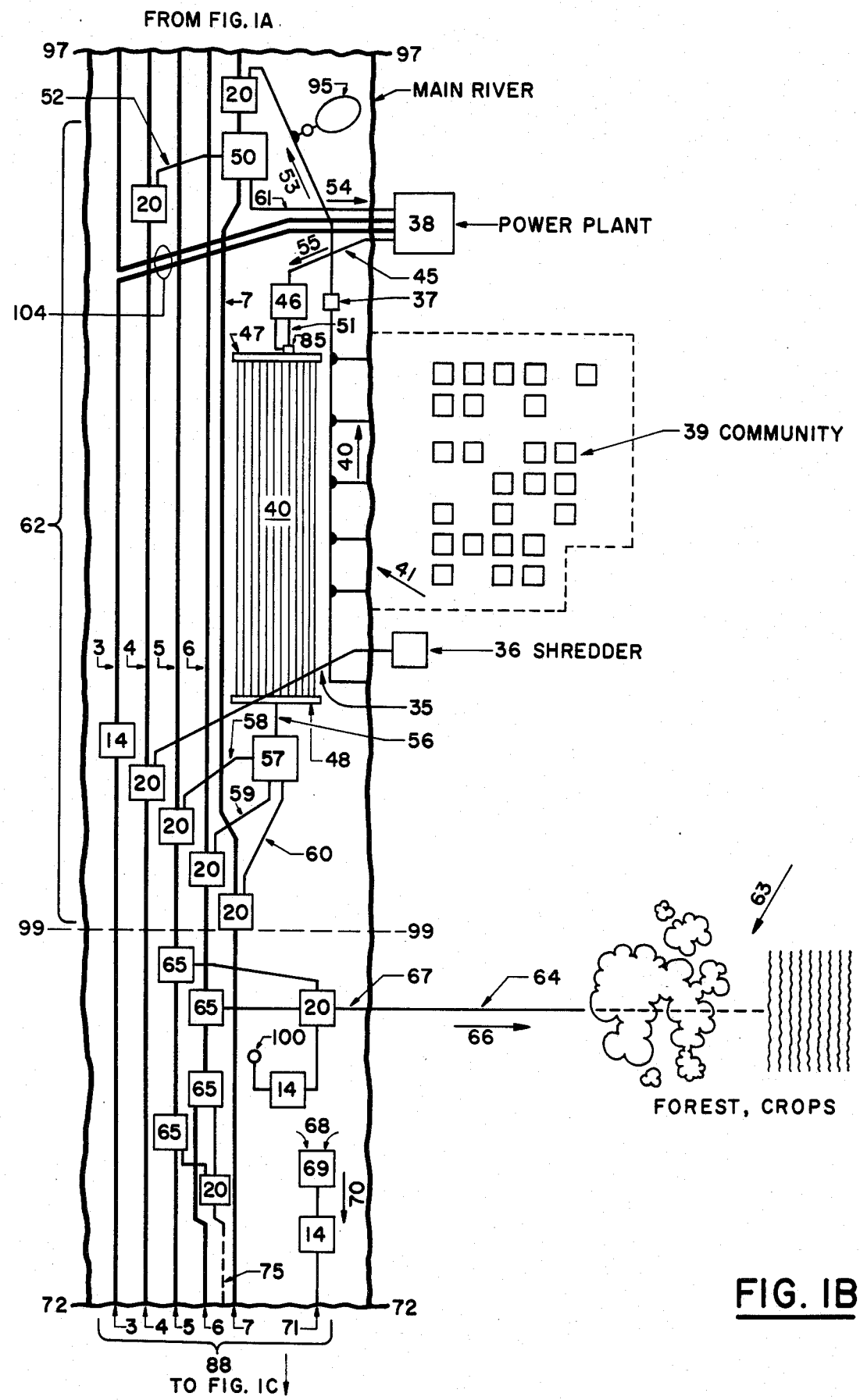
FIG. IB

FLUID TRANSPORT AND PROCESSING SYSTEM

I. FIELD OF THE INVENTION

This invention relates to sewage and water transport and processing systems; more specifically, this invention relates to sewage transport and processing and water transport systems based upon fluid equilibrium between transported material and a surrounding medium.

II. RELATED PATENT APPLICATIONS

In my four co-pending patent applications filed on the same date as this application and identified below, I have described apparatus and methods for use in conjunction with systems of the type described in this application. To simplify reference to those co-pending applications, I will hereinafter designate them as follows: My patent application entitled "Fluid Transport Conduit System In Equilibrium With Its Environment", Ser. No. 423,524, filed Sept. 27, 1982, now U.S. Pat. No. 4,469,596 (hereinafter identified as "*1"), pertains primarily to means for controlling the flow and contents within systems of this class. My patent application entitled "Fluid Transport Conduit System In Equilibrium With Its Environment: Conduit Configuration", Ser. No. 423,781, filed Sept. 27, 1982 (hereinafter, "*2"), pertains primarily to means for constructing, installing, and insuring the dynamic stability of conduits and vessels for use in systems of this class. My patent application entitled "Instrumentation and Control System Ser. No. 423,570, filed Sept. 27, 1982 for Fluid Transport and Processing System", (hereinafter, "*3"), pertains primarily to instrumentation for measuring the properties of systems of this class for the purposes of operation, preventive maintenance, and research. My patent application entitled "Apparatus and Method for Processing Wastes", Ser. No. 423,782, filed Sept. 27, 1982 (hereinafter, "*4"), pertains primarily to apparatus and methods for processing sewage, solid wastes, and thermal pollution, for systems of this class. The disclosures of my foregoing co-pending patent applications hereby are incorporated herein by reference.

III. OBJECTIVES OF THE INVENTION

It is the principal objective of the present invention to provide advantageous systems for removing pollution from our waterways, rivers, oceans and lakes. Such pollution includes sewage, solid wastes, thermal pollution, and industrial wastes. Another object of the present invention is to provide advantageous systems for transporting fresh water from rivers or other bodies of fresh water to regions in which it may be desirable to have a supply of such fresh water.

It is another objective of the present invention to provide for the control of water pollution, without requiring that communities change their existing sewage systems or water use habits, without requiring the use of additional expensive land or installation of unsightly equipment, and without the social and legal inconveniences caused by building on urban land.

In a system in which local waste processing facilities are used, small communities tend to build small facilities, and large communities larger facilities. For this reason, large manufacturing plants or other production organizations tend to locate in larger communities, so as to avoid having to bear costs associated with installation of additional pollution control facilities required to accommodate their needs. Thus, it is another objective of this present invention to provide for the control of water pollution in a way which does not require communities to perform liquid processing themselves, and thus does not dictate the distribution of population and economic levels within a river valley or other region, as might be the case if only local processing facilities were used.

It is a further objective of the present invention to provide pollution control apparatus and methods which are economically advantageous in comparison to other apparatus and methods known in the art.

It is another principal objective of the invention to provide water pollution control systems which can be rapidly and economically installed and brought into operation, and in which the technology used does not limit substantially the rate at which installation can proceed. It is an additional objective of the present invention to provide such systems whose construction can be implemented using modern massproduction techniques with high productivity, rather than construction using piece-work techniques and relatively lower productivity.

It is a further principal objective of the invention to provide systems for water pollution control and fresh water transport which can be made reliably and economically and whose operation can be assured even in the event of failure of many of the principal components of which the system is composed, so as to provide both high reliability and maintainability in operation.

IV. SUMMARY OF THE INVENTION

The foregoing objectives are met by the provision of a waste disposal and fluid carrying system which uses relatively inexpensive thin-wall conduit on or near the bottom of a body of water such as a river or lake, with the fluids in the conduit in fluid equilibrium with the surrounding water. Use of the bottom of the body of water instead of land as a conduit location is less costly in terms of money and social turmoil than building land-based systems. The ability to use thin-wall tubing reduces the systems cost. Other features and advantages of the invention appear in the abstract above, in the more detailed summary which follows immediately, in the detailed disclosure which follows thereafter, and in my co-pending patent applications which have been identified above.

A. Summary of the Principle of Fluid Equilibrium

When a flexible container holding a liquid is itself surrounded by a liquid, the pressure inside the container and the pressure outside the container can balance one another. This balancing of pressures substantially reduces the strength required in the flexible wall of the container. Thus, such containers can be made as vessels for containing fluids or as ducts for transporting fluids internally while surrounded by a fluid medium. This balancing of internal and external pressure can occur over a very wide range of depths and geometeric configurations.

When sewage or fresh water is carried as a stream in a duct located in a river, for example, all that is necessary is to separate the stream within the duct from the water outside the duct. Relatively little strength is required to effect the separation of the flows of the fluids. Flexible-wall ducts, suitable for this type of use, can be transported in a collapsed state, and can be installed substantially more easily than can rigid-wall pipe. I call such a flexiblewall duct an "equiduct".

Ponds can be constructed using the same principle. If a body of fresh water is placed on a body of salt water, the fresh water tends to float on the upper surface of the saltwater body. This fresh water can be separated from the salt water by a simple, flexible, membrane. This configuration I call an "equipond". Similarly, I call a pod or capsule using fluid equilibrium principles an "equipod".

Many physical effects can occur because of the flexibility of the walls in equiducts, equiponds and equipods. These are discussed in detail in my co-pending applications *2 and *4. Included in such effects are effects of wave motion of the surface, of collection of sediment in various portions of the system, evolution of bubbles in the system, and the like.

B. Augmenting Flow in an Equiduct System

Within an equiduct system, flow of fluid can be augmented by suitably designed flow augmentation means such as axial impellers, centrifugal impellers, and the like. Such flow augmentation means may be referred to herein, for the sake of convenience, as "pumps". These can be used to produce flow of a desired velocity, for example, to retain in suspension particulate matter transported with a liquid. This is discussed in detail in my co-pending application *1. Suitable spacing and operating criteria for such flow augmentation means can allow a flow-augmented system to operate effectively, even with failure of one or more of its flow augmentation devices. This allows removal of devices for maintenance, and effective operation of the system in a fail-safe mode. A flow-augmented system, meeting these design criteria, I call a "safely-augmented-flow equiduct system". These criteria and ways to meet them are set forth in my co-pending application *1.

C. General Accessory Equipment

For use with equiducts, a variety of accessory equipment is desired. This includes ways to merge flows from different equiducts, to adjust the relationship between pressure and flow velocity, control the flows by means of valves and flow augmentation and impedance devices, separate gases from liquids flowing in an equiduct, introduce dissolved gases into an equiduct, and the like. These are generally discussed in my co-pending application *1.

Other equipment is required for installing and maintaining equiducts. The need for such other equipment depends on the details of construction of the equiduct and its net operating buoyancy, and other characteristics of its operation as part of a system. Details of construction and installation are therefore discussed together in my co-pending application *2. Considerations such as the relative cost and effectiveness of different techniques for maintaining an equiduct in a selected position enter into the design of the equiduct wall itself and the ways in which such designs can be implemented. These are discussed in application *2.

D. Summary of Fresh Water Systems

By separating an internal fluid from an external fluid, an equiduct may readily be used for transporting fresh water within a surrounding medium of fresh water or salt water. Safely-augmented-flow equiduct systems of the type described in detail in my co-pending applications *1 and *2 might be advantageously used for transporting fresh water from available sources to places where it is needed, where a route exists through some suitable fluid medium. For example, the upper reaches of an estuary may contain fresh water from one or more rivers feeding into it. This fresh water could be taken from the river at a point upstream of the highest point reached by salt incursion. Then, this water could be taken to communities or other places located along the estuary, or located along the shore of the sea of which the estuary is an inlet. Such water could be useful for aquaculture, or for agriculture for irrigation purposes.

If desired, waste heat from power plants could be added to such water as it passes. This might be advantageous where the water is to be used for agricultural irrigation, or for aquaculture. Such increased temperature might be advantageously used to increase the rate of maturation or growth of plants or other biological organisms. At the same time, the thermal pollution from the power plant would be removed from the river.

In California, water is relatively more abundant in the northern regions than in the southern regions, and might advantageously be transported parallel to the coast, using a dynamically stable safely-flow-augmented equiduct system surrounded by ocean water. Suitable means for installing, positioning and controlling the dynamic properties of such a duct are discussed in my co-pending application *2. Suitable flow augmentation means for fail-safe operation of flow augmentation devices in such a system are discussed in my co-pending application *1. It is believed that the conditions of dynamic stability and safe flow augmentation were not understood previously in the art of transporting fresh water extended distances within flexible conduits immersed in seawater. See, for example, J. S. Connor, U.S. Pat. No. 3,467,013, in the light of the detailed discussions of dynamic stability in my co-pending application *2 and safe flow augmentation in my co-pending application *1.

E. Summary of Pollution Control Systems

There are several different types of pollution which can contribute to disturbing the ecological balance within a body of water such as a river, estuary, lake, ocean or the like. Among these are sewage, including both biological wastes and various types of industrial waste; solid wastes, including various organic and inorganic constituents; and thermal pollution, such as may be introduced into a body of water by a power plant in the course of rejecting its waste heat. Although the details in each case may be different, all of these forms of pollution may be handled by a suitable fluid transport system placed within the body of water. One remarkable feature of such a combined system is that thermal pollution can in some cases advantageously be used in reducing the cost of processing sewage pollution and solid wastes. Where relatively highly toxic or difficult to process materials are involved, industrial wastes could be handled by a substantially separate system from that system which handles sewage, solid waste, and thermal pollution. If desired, thermal pollution could be made available as a heating source, also, for processing industrial wastes.

With reference to my co-pending applications *1, *2, *3 and *4, I will summarize the general features of a system which can process each of the three principal types of waste mentioned above. Then, with reference to the figures, I will describe in more detail selected examples of such systems. Then, with reference to the systems used as examples, I will discuss selected rules for operating such systems under the heading Operating Algorithms. For specificity in the following discussions, I will use as an example the case of a polluted river which forms, in its lower reaches, an estuary.

F. Sewage Handling

Sewage ordinarily would contribute to pollution of the river or other body of water by being dumped into tributaries of the river or the river itself from various communities located along the tributaries or the river. With relatively minor modification of the outlets which presently dump sewage into the natural body of water, this sewage can be conveyed instead into equiducts located within these bodies of water. Just as the tributaries join successively to form the main river, so can these ducts join successively to form a main equiduct system within the main river. In this way, sewage can be collected without ever becoming mixed with the main body of water. Thus, the tributaries and the river can be kept free from sewage. Processing of this sewage can begin almost as soon as it enters the equiduct system. In my co-pending application *4, I discuss ways in which such processing can be implemented during the transport of sewage within an equiduct system. Additionally, more localized processing facilities can be spaced at suitable intervals along the equiduct system. Such processing facilities would process more sewage and could be operated more economically than separate facilities located within smaller communities.

As sewage transported within the equiduct system is processed, either along the length of the system or in processing plants spaced along the system, biological wastes concentrated from the sewage within these plants can be transferred to a second equiduct system paralleling the first, within which this more concentrated material could be transported to a suitable location for further processing. Such further processing might also occur during the transport of the concentrated material, or at plants spaced along the transport system.

Normally, the non-polluting processed wastes are carried out to sea or to the depths of a lake. However, fresh water yielded from the sewage by thorough treatment could then, if desired, be allowed to reenter the river, contributing to its flow and reducing salt incursion into the river from the estuary. Also, if desired, biologically detoxified nutrient material from the sewage could be introduced into the natural body of water in a controlled manner along substantial portions of the length of the equiduct system. This could be advantageous in aquaculture, and in improving fishing and other properties of the river. However, such a use of the water released during processing, and of the nutrients available after detoxification, is not mandatory.

G. Some Advantages of Equiduct Sewage System

An equiduct sewage collection and processing system of the type described above offers many substantial advantages. First, it requires only minimal modification of existing municipal sewage facilities. This is because any municipal sewage system which previously dumped wastes into the river could be readily connected into the equiduct system. A second advantage is that the equiduct would not require for its installation any land which currently is not part of the tributaries or the river. Thus, there would be substantially no problem associated with acquiring a right-of-way for the system involved. A third advantage is that the tributaries and river all naturally drain in the direction in which the sewage is to be transported. Thus, there is a pipeline bed, with a natural grade, free for the taking. The natural grade reduces pumping requirements for transporting the sewage as compared with the pumping of sewage on land, where the sewage often must be pumped up over rises in the land.

Additional inlets to the equiduct system can readily be added. During its construction, provision can be made for such inlets, so as to reduce the amount of effort required subsequently to bring them into use. Thus, population shifts or shifts of industrial plant capacity might be accommodated substantially more readily than might be the case were small processing plants to be located at each community. In the event that small processing plants were located at each community, a relatively large industrial operation might be relatively reluctant to locate in a small community, for which its additional contribution of effluent might require additional effluent processing capabilities; whereas if the same plant were to move into a relatively large community, its contribution would represent a substantially smaller fluctuation in the total loading of the effluent processing facilities. Thus, use of local processing facilities in each community might have the substantially undesirable effect of tending to freeze the economic distribution within the river basin. Thus, the use of an equiduct system could offer a substantial social advantage in avoiding freezing-out various smaller communities from economic growth.

H. Rapid Installation

The cost and time required to install an equiduct system can be less than for comparable land-based systems because the materials can be transported on the river by barge. This is very desirable for heavy construction equipment and materials. Furthermore, because of the nature of the equiducts, they can be constructed in long lengths, using large-scale mass production techniques, and then floated to the site at which they are to be installed. The floating can consist of placing the equiducts on barges, or of closing the ends of each length of duct to form a floating tube, and then floating the tube to the site. Such installation, could consist merely of laying them off the back of a barge, or simply sinking the floating tube by removing the end covers. This is discussed in more detail in my co-pending application *2. Such laying could proceed extremely rapidly, at rates as great as, for example, one half a mile per hour or more. This rapid rate of installation, together with minimal modification of existing facilities and lack of need to obtain right-of-way, could allow an equiduct system to be installed in a river and its tributaries very much more quickly than other means of water pollution control might be implemented. Suitable construction, laying and joining techniques are discussed in my co-pending application *2.

I. Handling Solid Wastes

Typically, the mass and volume of solid wastes produced by a community is very much smaller than the volume of sewage produced. Such solid waste can be pulverized, shredded, ground, or otherwise suitably comminuted to allow it to be transported as a suspension with sewage from the community. Flow augmentation (pump) means suitable for operation in a safely flow augmented equiduct system transporting debris are discussed in my co-pending application *1. Effects of such debris on the buoyancy of equiducts and on the desirable wall construction for equiducts are discussed in my co-pending application *2. Means for processing such debris are discussed in my co-pending application *4. Essentially, the same equiduct system which would be useful for collecting the sewage could serve, with relatively minor modification, to transport substantially all of the solid debris from the communities served by the equiduct system. By accommodating the solid waste disposal of communities served by it, such an equiduct system could allow a substantial reduction in the amount of incineration of solid wastes, thus contributing indirectly to a substantial reduction in air pollution.

J. Handling Thermal Pollution

Instead of using river water for cooling power plants or other sources of waste heat, and thus causing thermal pollution in the river, sewage transported within the equiduct system can be used advantageously to accept the heat rejected by such plants. The waste heat would then heat the sewage and raise its temperature. The thermal conductivity of water and the materials of which the walls of equiducts typically are made are so poor that relatively little heat flows from the liquid in the equiduct to the river water. Thus, the thermal pollution of the river is substantially eliminated.

Remarkably, under some circumstances, thermal pollution within a sewage-carrying equiduct can be put to good use. Ordinarily, thermal pollution in a river has two substantial means for producing deleterious effects. The first is that raising the temperature of water reduces its ability to hold oxygen in solution. Thus, the amount of oxygen available to support biological processes within the river can be reduced by the increase in temperature associated with thermal pollution. A second effect of increasing the temperature is to raise the rate at which biological processes occur, and thus raise the demand for oxygen. These two effects can conspire to reduce the oxygen present in the water to so low a level as to make the river substantially unsuitable for fish and other oxygen-using aquatic organisms. Instead, anaerobic processes can take over, giving rise to foul odors and deterioration of the water environment. However, as I discuss in my co-pending application *4, the amount of oxygen in solution within an equiduct can readily be maintained at a quite substantially higher level than occurs naturally within a body of water. Such a high level of dissolved oxygen can be maintained by aeration techniques, by oxygenation with substantially purified oxygen, and by a combination of these processes performed at a substantial depth within the surrounding body of liquid, so that the partial pressure available for solution can be made very much higher without the need for pressure vessels. This is because, when the equiduct is located at a substantial depth within the surrounding liquid, the pressure of the liquid at that depth bears upon the equiduct and allows it to support within itself a substantial dissolved pressure of gases without a gaseous phase being evolved. Thus, the dissolved oxygen within the equiduct can be maintained at a quite substantially higher level than might be found in a naturally occurring body of water.

With the capability of providing a substantially higher partial pressure of oxygen in solution, an equiduct system can accept a substantial increase in temperature within the liquid transported within the system. This is because the reduction in ability of water to hold dissolved oxygen as its temperature increases can be more than compensated for by the ease with which oxygenation can be provided within the equiduct system. This greatly increased oxygen level, in turn, allows the much higher rate of biological activity to be supported without using up the available oxygen. Such rapid biological processing can be desirable in biologically purifying the sewage transported within the equiduct. With substantially increased rates of biological activity, the amount of time required for processing the sewage can be substantially reduced. This, in turn, reduces the distance traveled within the equiduct system associated with this processing. In those systems in which processing can be substantially completed during the transport of sewage, the need for processing plants can be substantially reduced. Thus, introduction of thermal pollution into a sewage-carrying equiduct can contribute favorably to the overall operation of the system, with possible economic benefit associated with reduced capital and operating costs for processing plants. When the equiduct is used in a long river, such processing during transport can become especially significant. One consequence of such processing could be to reduce the amount of material which must be transported through portions of the system located downstream from where this processing occurs.

Controlling thermal pollution could facilitate the use of the nuclear power instead of fuel burning plants in the production of electricity without adverse thermal pollution effects caused by rejected waste heat. Conversion to nuclear power could allow a substantial reduction in the amount of air pollution produced in conjunction with the generation of electric power. Thus, indirectly, control of thermal pollution by such a system could contribute substantially to reducing air pollution.

Water or sewage within an equiduct system can accept waste heat, from a wide variety of sources, of which power plants are only one example. Many industrial processes deliver large quantities of low grade heat into their environments.

In addition to the agricultural and aquacultural uses for fluids warmed by such waste heat, some of which are set forth elsewhere herein, direct mechanical uses may be economically desirable. For example, controlled release of warmed fluids, such as properly treated effluent, could reduce the cost of keeping the shipping channel(s) of a harbor open in cold weather, when ice would normally form. Ice might be prevented from forming during part of the time when it might normally form, and could be kept thinner during other parts of the year, and thus be less expensive to remove.

K. Controlling Water Pollution to Reduce Air Pollution

A substantial fraction of all of the air pollution associated with metropolitan centers is directly or indirectly attributable to the generation of electric power and the disposal of solid wastes. By accommodating thermal pollution, an equiduct system located within a river would allow operation of power plants with relatively higher waste heat rejection for the same electric power output. As currently constructed, nuclear power plants operate with a somewhat lower efficiency than do fuel burning plants. Thus, they have a higher heat rejection for the same electrical power output. The use of an equiduct system to control thermal pollution could facilitate the use of nuclear power in preference to the burning of fuel in the production of electricity. The use of an equiduct system to remove solid wastes could allow a substantial reduction in the amount of incineration. Thus, by handling these two forms of water pollution, an equiduct system could contribute substantially to reducing air pollution.

L. Aesthetic Advantages

An equiduct sewage collecting and processing system can offer substantial aesthetic advantages in preserving the natural beauty of a body of water. Such a collection system is submerged below the surface of the water so that it is unobtrusive. Similarly, as explained in my co-pending application *4, processing plants can be almost entirely submerged. In this way the affect on the appearance of the river can be minimized. In processing sewage, location of the equiduct at a substantial depth can offer advantages with respect to oxygenation of the contents of the equiduct. This is discussed more extensively in my co-pending application *4. Thus, there are technical reasons which also suggest a form of implementation for an equiduct sewage system which tends to make it less conspicuous. Thus, it is not necessary to sacrifice aesthetic values in order to clean the river. The unobtrusiveness of an equiduct system can properly be counted as a substantial aesthetic and social benefit.

M. Aquaculture

Richly oxygenated, warmed sewage in an equiduct can provide a highly advantageous growth medium for micro-organisms. These micro-organisms, while serving to clean up sewage, also become available as the base of a food pyramid which can support higher aquatic organisms. In an extended equiduct system, such aquatic organisms can be introduced directly within the ducts and transported with the micro-organisms which they consume. In a shorter system, the micro-organisms might be used to promote the growth of shellfish or other organisms which are relatively easily seeded and harvested. At the increased temperatures, oxygen levels, and nutrition levels available from the processing that occurred within the equiduct, such aquatic organisms might grow and reach maturity at a substantially higher rate than without such a special environment. This could have economic benefits.

By suitable choice of biological organisms, and by suitable introduction upstream of selected portions of population sampled downstream, a closed-loop biological culture system could readily be maintained within the equiduct. This is discussed in more detail in my co-pending application *4. The general principle applies both to equiducts used as transport systems and to processing plants.

N. Agriculture

After adequately thorough treatment, water containing a suitable balance of nutrients for agriculture could be made available for irrigation purposes. This could reduce the amount of fertilizer required at the same time as it provides water for growth. In the event that thermal pollution has been absorbed by the sewage within a system, the water with nutrients resulting after processing might typically be expected to have an elevated temperature. This increase in temperature could be quite advantageous in increasing the rate of growth and maturation of plants, and in increasing the growth season, thus allowing a higher yield for the same amount of land. In this way, such a system could bring about the closing of the loop by which nutrients are returned to the soil to be used again in the food production chain. In a transport and processing system, where this use is intended for processed effluent, it could be highly desirable to segregate industrial wastes of questionable nature and to transport them within an entirely separate equiduct system, so as to avoid introduction of materials whose long-term ecological and biological consequences are not yet known.

O. Special Bioproducts

The environment within an equiduct transporting sewage or concentrated sewage can, under some circumstances, be advantageously used with special micro-organisms to produce desired by-products. For example, a heated, highly-oxygenated equiduct system transporting concentrated biological sewage might advantageously be used as a culture medium within which could be grown micro-organisms having a desired protein content for use as animal feed supplements or for other uses. Such extensive culture media could be used, if desired, for large-scale culturing of micro-organisms which produce trace quantities of a desired by-product, such as a pharmaceutical product.

Anaerobic processes could be implemented within equiducts to provide various decomposition products such as methane, which might have useful fuel value. Such fuel gases might advantageously be used to produce power to actuate flow augmentation means spaced suitably along the length of the equiduct system.

Suitable organisms are known for the bioprocessing of many wastes which might otherwise be difficult to handle. There are a variety of organisms which concentrate various constituents of the environment and allow them to be recovered in ways different from what might be required were they dispersed in the environment. Some organisms selectively trap various kinds of metal from their environment. Others attack cellulose. Useful industrial products such as alcohol, acetic acid, and acetone are available as by-products from the activity of cultures of special micro-organisms. Given the availability of such an extensive nutrient medium in which micro-organisms could be cultured, it is quite likely that it would be economically rewarding to develop more micro-organisms which produce special products of economic value.

Combinations of biological processes, mechanical processing, and chemical processing could allow production of fuels and other by-products from sludge, sediment, or other material transported within the equiduct system. High-pressure hydrogenation might be useful to convert sludges of micro-organisms into useful fuels. These micro-organisms, in turn, would have fed upon the sewage present within the equiduct system and upon the solid wastes which had been introduced therein as a suspension. One practical first use for any such fuel yield could be in the operation of the equiduct system itself.

Various portions of the equiduct system might advantageously be used in different biological, chemical, or physical processes so as to provide a balanced diversity of output of ecological, economic, or other value.

P. Avoiding Pathogenic Cultures

Under some circumstances, operating conditions within an equiduct system which had received heat and had a suitable chemical composition, including levels of dissolved oxygen and other dissolved gases, might approximate those found within the human body or within the bodies of domestic animals. Under such circumstances, considerable care might reasonably be exercised so as to avoid undesirable cultures within such a medium. Under some circumstances, cultures of organisms similar to those which could grow within the human body might be desired for pharmaceutical byproducts or for other reasons. However, the existence of such a state within the equiduct system ought properly be noted, and provisions made to control the possible growth of pathogenic organisms therein. One of the simplest ways to avoid culturing pathogenic organisms might advantageously be to manipulate the quantities of dissolved gases or the temperature within such an equiduct. Thus, temperature and nutrient levels like those in the human body might be fully acceptable within an equiduct were the partial pressure of dissolved oxygen to depart substantially from that tolerated by pathogenic organisms. For example, in an equiduct or equiduct processing bed located at a substantial depth within surrounding liquid, it could be relatively easy to provide a substantially higher concentration of dissolved oxygen than might be found normally in the human body. Considerations of this type are discussed in my co-pending application *4. Such potential hazard can readily be avoided, as is discussed more fully therein.

V. DESCRIPTION OF DRAWINGS

Figure 1D:
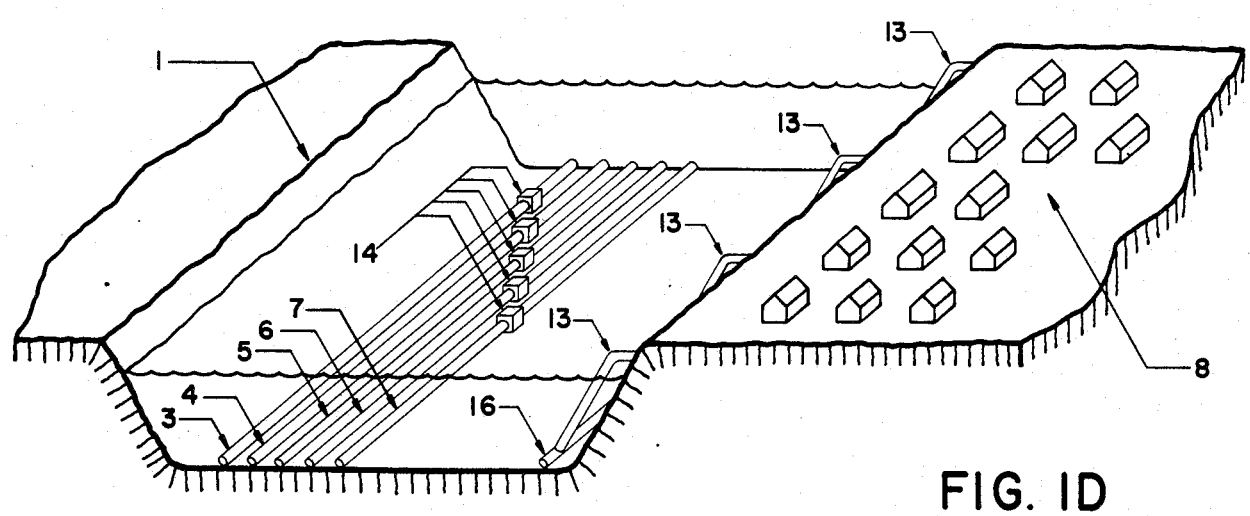

FIGS. 1a, 1b and 1c together form a schematic plan view of an equiduct system of the present invention, and FIG. 1d is a cross-sectional perspective view taken along line 1d—1d of FIG. 1a.

VI. COMPLETE EQUIDUCT SYSTEM ENDING IN OCEAN

Consider, as an example, a river (e.g., the Hudson River), with tributaries, which feeds into an estuary in its lower reaches, spreading into the sea, with a sound nearby. Using fluid equilibrium systems, a complete system might be implemented to control all forms of water pollution occurring within this body of water, and to provide for the delivery of fresh water to regions along the shore of the sea. In the pollution control portions of such a system, pollution control duct systems within tributaries would merge into progressively larger ducts within the river. As the material progressed within such ducts, it could be processed by biological activity or chemical action so as to substantially purify it in many cases. Within the body of water might advantageously be located a plurality of equiduct transport means. Within these transport means, fluids of different composition or of different states of purification might advantageously be transported.

In FIGS. 1a, 1b and 1c is depicted an extended system of this general class. A river 1 flows in the direction of arrow 9. Broken line 2 designates that the portion of the system depicted in FIG. 1a is a continuation of a system contributing flow thereto from portions upstream in the river. Within this river are equiduct means 3, 4, 5, 6, and 7. As it will be explained in greater detail below, it is preferred that each of the conducts 3–7 carries a different substance so that the conduit can be given an optimum design for carrying that fluid. At location 91 are appropriate flow augmentation and valving means 14 within each of the equiducts. In order to allow portions of equiduct to be removed for maintenance, it could be advantageous to use a pair of equiducts for each line 3, 4, 5, 6 or 7. Thus, line 3 can represent a pair as well as a single equiduct, and the corresponding station 14 can represent a pair of flow augmentation means, with valve means suitable for allowing the flow to be directed substantially through one or the other or both of the equiducts downstream from the valving station.

An example of the flow augmentation (pumping) and valving means 14 is given in FIG. 26 of my co-pending application *1 and designated 1127 therein. Although flow augmentation and control stations are depicted at various locations along the lengths of the equiduct systems 3, 4, 5, 6, and 7, it is to be understood that transport of different material within such equiducts and use of different diameters and flow velocities might advantageously lead to different choices of spacing of flow augmentation and control means for the different equiduct systems used.

A. Non Bio-Degradable or Chemically Non-Degradable Substances

For specificity, consider a pollution control system in which the equiduct transport systems are used for the following fluids. Assume that equiduct system 3 contains noxious fluids which are substantially difficult to process by ordinary biological or chemical means. Examples of such fluids might be those containing cadmium, mercury, various chlorinated compounds, and the like. These would be primarily noxious industrial wastes, and could represent a relatively small fraction of the total of industrial wastes and a substantially smaller fraction of the total of all sewage and industrial wastes together. Equiduct system 3 might therefore advantageously be designed with substantial safety factors so as to reduce to a negligibly small level the risk of accidentally introducing such noxious material into the river. Such equiducts, for example, might also be armored in a suitable fashion to reduce hazards of accidental damage or sabotage. Construction of suitable equiducts with protection against mechanical damage is discussed in my co-pending application *2.

B. Solid Wastes

Assume that equiduct transport system 4 contains suspended solid material transported in a relatively rapidly moving liquid. Such an equiduct could require relatively greater pumping power in order to achieve a relatively higher flow velocity than would be required for the transport of sewage containing relatively little solid material. Such a rapidly flowing stream of fluid might advantageously be used to transport a substantial portion of all of the types of solid material which need be disposed of by a community located along the river. The carrying capacity of such a suspension transport equiduct system could relatively easily be made quite adequately large to transport the amount of material normally disposed of by such communities. Such a continuous transport process can relatively easily be made to transport quantities of material which would be difficult to transport by most other means in as economical a fashion. Such solid material in form suitable for transport in suspension could be introduced directly into equiduct transport system 4 by suitable pulverizing and shredding apparatus, or could be removed from raw sewage for transport within such an equiduct system.

Because of the nature of wear and other properties associated with the transport of suspended material at substantial velocities, special design may be desirable for such a debris-transporting equiduct system. Design considerations related to this are discussed in my copending application *2. In particular, under such circumstances, the relatively great wear resistance of various elastomeric and filled elastomeric materials might advantageously be used in helping the internal wall of such an equiduct resist the continual abrasion associated with transporting such material.

C. Biologically Active Detoxified Sludge

Assume that equiduct transport system 5 carries sludge left from purification of sewage. Such sludge could be substantially detoxified during the process of forming the sludge and separating it from the sewage. Thus, such material might not represent an appreciable hazard to health. However, because it could contain a substantial amount of nutrients, introduction of all such material into the river water might deleteriously promote excessive growth of organisms within the river. For this reason, such sludge might advantageously be transported within a suitable equiduct transport system. However, if desired, portions of such sludge might be used to support or increase the amount of aquatic life within various portions of the river by selectively introducing it therein. Also, portions of such biologically active material might advantageously be introduced into irrigation water taken from the river, or from the equiduct transport systems within the river, so as to act as fertilizer in the regions being irrigated. Alternatively, or possibly simultaneously, special cultures might be introduced within such biologically active sludge transported within equiduct transport system 5, so as to culture organisms with desired nutritional value for use as feed supplements, or desired for their chemical or pharmaceutical by-products. Use of special cultures in equiduct systems is discussed in more detail in my co-pending application *4.

D. Oxygenation

Because such biologically active sludge may contain a substantial amount of nutrients at a moderately elevated temperature, it may be highly advantageous to introduce oxygen in such a duct by aeration or by adding oxygen. A suitable station for removing dissolved gaseous by-products and introducing suitable aeration in such an equiduct system is depicted in FIG. 36 of my co-pending application *1 and generally designated 695 therein. Thus, flow augmentation stations 14 within sludge transport equiduct system 5 might advantageously be oxygenation or aeration stations. This would depend in detail upon the types of micro-organisms being cultures within such an equiduct system. Under some circumstances, anaerobic processes might be desired; under others, aerobic processes. For this reason, flow augmentation means 14 in region 91 located on equiduct system 5 is also labeled (695). Thus, flow augmentation stations in equiduct system 5 might advantageously be constructed in the way depicted in FIG. 36 of my co-pending application *1. Additional flow augmentation could be provided as desired, for example, by various means as set forth in my co-pending application *1.

E. Processed Effluent Transport

Because of the relatively poor thermal conductivity of liquids and of elastomeric materials which might advantageously be used in the construction of equiduct walls, heat transfer between the liquid contained within an equiduct and its surrounding medium occurs at a relatively low rate. Thus, heat can be transported merely by pumping a heated liquid through an equiduct. Increases in temperature of the fluid within an equiduct can be advantageous in reducing the amount of equipment required for processing sewage. However, the processed effluent therefrom could contain a substantial portion of the heat introduced into the sewage. Although the effluent might be clean enough to release into the river, it might be relatively undesirable to release it at a single location because of the undesirable heating this might produce. This warmed effluent could be transported within a suitable equiduct transport system 6 and released into the surrounding river at a controlled rate. Thus, the rate at which organisms within the river grow might advantageously be controlled. For example, the maturation period of such organisms might be substantially reduced, which could have economic benefits. Also, the growing time during each year could be increased by controlled introduction of such warmed fluid in larger amounts during relatively colder weather.

Such treated effluent could advantageously be used for irrigation purposes. Under such circumstances, heat carried by such liquid could advantageously increase the rate of growth and lengthen the growing season for agriculture organisms. For example, forests, fields of grain, or other types of plant organisms might be irrigated using such water. If desired, additional nutrient materials from the biologically active sludge transport system might be mixed with such water to increase its effectiveness in fertilizing plants.

F. Raw Sewage Transport

Raw sewage can be transported by one of the equiduct conduits 7 in the river. The flow augmentation means 14 in conduit 7 might also include aeration means so as to provide for aerobic activity within the equiduct. For this reason, flow augmentation means 14 in region 91 is labeled 695, corresponding to the labeling for equiduct system 5. This is optional. Under some circumstances, use of aeration might be desirable in promoting the biological processing of material transported within the equiduct during the course of its flow. In the event that such material had been used to carry waste heat from a power plant, or had otherwise been raised to a higher temperature, the increased rate of biological activity associated with such increased temperature might make it relatively more advantageous to dissolve additional oxygen in the sewage transported within the duct. The depth at which the duct is located could be used to influence the amount of oxygen which could readily be dissolved within the liquid contained therein, as is discussed in more detail in my co-pending application *4. A similar effect could be used in connection with duct 5 transporting biologically active sludge.

One of the principal advantages of an equiduct system of this class for collecting sewage is that raw sewage might be introduced into equiduct transport system 7 at any location along the length of the river. Thus, it would not be necessary to install additional processing capacity for processing effluent when population increased in a region along the river, or when a large industrial plant moved into a location along the river or its tributaries. This flexibility of use of the system can work to the advantage of both industries, and of communities located along the river, by allowing the communities to attract industrial organizations which might raise the economic level of the communities. Simultaneously, such flexibility of collection and processing for sewage can work to the advantage of the processing equipment, by allowing it to operate with a larger sewage source for its base load, thus facilitating operation at a higher fraction of its total capacity.

G. Parallel Collection Ducts

Next to river 1 is depicted a community 8 with a multiplicity of exit ports 10 through which it previously dumped sewage into the river. These are connected, by suitable connection ducts 12 and 13, to a parallel collection equiduct 16 by means of suitable connectors 11. Sewage is collected within equiduct 16 and transported therein in the direction of arrow 17, actuated, for example, by gravity feed from the outlets 10. The pressure in equiduct 16 might be substantially less than the pressure in equiduct 7. Sewage collected into equiduct 16 can pass through optional gas segregation means 37, such as the device 552 shown in FIG. 30 of my co-pending application *1.

The connector 11 may optionally be designed to prevent backflow of gas or liquid into ducts 12 or 13 by which outlets 10 are connected to junctions 11. As another option, an inlet 94 can be included at the far end of duct 16 from gas segregation means 37. This inlet could connect through suitable flow augmentation means 14 into the duct 16.

Liquid can be taken from the river in order to provide a fast flush through duct 16 to clear debris from it. This might be unnecessary in the event that peak loading, for example during storms, provided sufficient flow velocity to re-suspend material accumulated within the duct 16. In that case, inlet 94 and the flow augmentation means 14 and connector 11 connected to ducts 12 and 16 would be unnecessary. Duct 12 could then feed directly to duct 16, or through some suitable flow-reversal-prevention and gas-trapping means. Thus, under many circumstances, it may be unnecessary to have any flow augmentation means at all in duct system 16, whether for fast flush or for flow augmentation therein. Optionally, additional flow augmentation means 14 can be included within equiduct system 16 in the event that the collection from outlets 10 requires flow through a sufficient length of duct so as to make additional flow augmentation advantageous. Alternatively, a city such as 8 might be served by a plurality of collection systems, each of which fed separately into conduit 7.

From the gas segregation station 37, raw sewage proceeds to an optional junction 19 for connection through suitable flow control (valve) means 18 to an "equipod" 15. This optional configuration of equipod, valve, and junction could be used for smoothing peak loads, thereby allowing subsequent processing equipment to be designed for a peak capacity more closely approximating the normal operating load. This could result in savings in equipment, and possibly in the use of equipment designed for more efficient operation at the normal load, by reducing the overcapacity required within such equipment. For example, processing equipment located downstream, by which such raw sewage would be detoxified, might be made with smaller peak capacity.

This complete assembly, flow augmentation, gas segregation and peak smoothing system by which community 8 delivers raw sewage into an equiduct system 7 is generally designated 31. This is a shunt system running in parallel with the equiduct system for part of the length of the river, and may have many of the features of the general equiduct transport systems. Depending upon capacity and upon seriousness of hazard associated with accidental or intentional destruction of portions of the system, the system used may have multiple parallel conduits or a single conduit; it may have flow augmentation means and valving, or merely be gravity fed, and in general be configured in a way appropriate to the use of fluid equilibrium systems for the transport of the sewage within the surrounding medium of the river with adequate reliability. This flow of sewage would then be merged with raw sewage being transported within equiduct 7, by means of a suitable merging system 20. This merging system could, if desired, be combined with a flow augmentation station.

A general merge and flow augmentation station 405 is shown in FIG. 26 of my co-pending application *1. Note that the rate of flow of raw sewage within equiduct transport system 7 may be variable. Peak flow may be reduced by use of equipods. However, because of the range of loading which may be anticipated for such a system, it would be advantageous if the system would give efficient pumping and handling of sewage over a relatively wide range of flow velocities. For example, a multiple duct system might be used for equiduct transport system 7, in which the ducts were of different diameters and carrying capacities. In this way, large ducts could be available for carrying large flows, while small enough ducts could be used for smaller flows to allow the flow velocity to be sufficiently great so as to avoid excessive settling of sediment from the sewage transported.

In this respect, equiduct transport system 7 has somewhat different requirements from equiduct transport systems 3, 4 and 5, in that operation may be desired over a relatively wide range of total flow, whereas equiduct systems 3, 4 and 5 may advantageously have their total flow controlled by other factors, such as dilution. Controlled dilution of the contents of these equiducts might be advantageous in providing sufficiently high velocity of flow to avoid sedimentation or to re-suspend sediment occasionally. Such dilution may represent a more desirable choice economically for such systems than might the additional complexity of equiducts with different diameters connected in a parallel system. However, wide ranges of flow velocities and flow capacities can readily be accommodated without departing from the scope of the invention as set forth herein, for example, by the use in parallel of equiducts with substantially different carrying capacities with suitable valving for distributing fluid to flow in varying proportions through these different ducts. In the event that a large equiduct is used only as a standby for use during peak load periods, it might be allowed to collapse when not in use. This collapse could be advantageous in preventing decay and other biological processes from occurring within stagnant fluid, in an uncollapsed tube, and thus prevents the undesired evolution of gas in regions where gas segregation stations are not readily available. However, such a partially collapsed duct in general would not be desirable for carrying flowing fluid, because of surface wave effects and other considerations which are discussed in more detail in my co-pending application *2. For example, the buoyancy of such a duct might become a substantially unknown quantity in the event of partial collapse.

H. Solids Collection

Community 8 might have a central collection facility for solids, for instance, for garbage trucks collecting solids which otherwise would be carried to an incinerator or dumping ground. Without disrupting that collection system, a suitable shredder and pulverizer 36 might advantageously be installed to serve the community. Although only one is shown, more may be desirable. Solid wastes from the community would be delivered to this processor, which would divide it into sufficiently fine particles to allow it to be transported through a connecting equiduct link 35 and merged at a merging station 20 with other material transported within the equiduct 4 reserved for carrying solids. If desired, biological processing using high levels of oxygenation can be implemented within duct 4, using processes discussed in connection with the duct 5. For example, flow augmentation means included within such a system might be of the type 695 (shown in FIG. 36 of co-pending application *1) by which the removal of gaseous byproducts and re-oxygenation might be implemented. Depending upon the nature of the processes to occur within equiduct transport system 4, this oxygenation may or may not be necessary, depending upon whether aerobic or anaerobic biological activity was desired during that portion of the equiduct transport system. Such oxygenation or dissolved gas control stations may be intermingled as desired with mechanical flow augmentation means, to provide for suitable flow within the equiduct system.

I. Processing Within the Equiduct Transport Systems

Material being transported by an equiduct transport system, such as 3, 4, 5, 6 or 7, may spend a substantial amount of time within such a transport system. Because of this, various types of processing may advantageously be implemented during the transport of the material therein. Such processing could be chemical or biological in nature. For example, suitable biological cultures might be introduced into any of these transport systems to provide for processing of the material in a way which reduced its noxiousness or provided desired byproducts. For example, special cultures might be introduced into noxious materials transport duct system 3. These cultures might be relatively undesirable in ordinary biological ecosystems, but might be tailored specifically to degrade some noxious chemical product found therein. Equiduct transport system 4, carrying solids, might contain cultures of microorganisms suitable for the decomposition of cellulose, of various plastics, of garbage, and of other materials which might be found within the equiduct system. In this way, relatively inert solids might be left at the end of the transport process and desirable byproducts might be produced from the biological cultures used. This kind of processing has already been discussed in connection with equiduct transport system 5 for transporting sludge. Equiduct system 6, used for transporting processed effluent, might have various polishing steps performed within it, by which the quality of the contents therein would be raised to a level sufficient to allow them to be used for drinking water or for release anywhere within the river.

Consideration ought properly be given to any temperature differences between the water carried within equiduct system 6 and the surrounding medium in determining the desirability of, and ways in which, such water might be released to the surrounding medium. Other applications for such water are discussed later herein. Similarly, equiduct system 7 might be used for transporting sewage while processing the sewage. For this reason, several ducts might be used for equiduct transport system 7, so as to allow relatively long stretches of transport of sewage within equiduct 7 during which it could be processed substantially to completion. At the same time, any new sewage would be introduced into a parallel duct, so as to avoid contamination further, with fresh sewage, sewage which had been partially processed already. This can be thought of as simply an extension of the principle of the shunt feed systems 31 discussed above.

Various means for controlling and implementing biological and chemical processes within the equiduct transport systems might be desirable for the different contents transported. In my co-pending application *1, I set forth a variety of ways in which the content of dissolved gas within such equiduct systems may advantageously be controlled. Such control of dissolved contents may be used in conjunction with, or separately from, control of the temperature of material transported within such equiducts. Waste heat from power plants located upstream might advantageously be used to raise the temperature and rate of biological activity within such equiducts. As is disscussed in my co-pending application *4, such processing can advantageously occur at a greater augmented rate, because of the special environments which may readily be provided within an equiduct transport system. For example, a substantially higher partial pressure of dissolved oxygen may be readily maintained within such an equiduct system compared to that which might be found in a naturally-occurring body of water. Operation of an equiduct transport system at a substantial depth would allow substantially higher partial pressures for dissolved gas than could be supported at atmospheric pressure. For this reason, when biological processes are to be used which absorb or evolve dissolved gases within the surrounding liquid, the depth at which the equiduct is located might advantageously be made quite substantial. Dynamic considerations associated with the evolution and absorption of a gaseous phase are discussed in my co-pending application *2. Such effects might, for example, affect the net buoyancy of the equiduct. Thus, controlling such effects could be quite advantageous in providing for the proper operation of the system as a whole.

The rates of biological activity within the various equiduct transport systems may be different for different systems and for different cultures used therein. For this reason, the spacing of gas introduction and removal stations would be selected partially on the basis of considerations of biological activity. The spacing of such stations may or may not coincide with the spacing of flow augmentation means. Also, such stations may be combined with flow augmentation means, if desired. Only a few such flow control and augmentation stations are depicted in equiduct transport systems 3, 4, 5, 6, 7, 16, and the like. Although only a few are depicted, it is to be understood that such stations may be used wherever necessary in controlling the content and flow properties of the material transported within these equiduct systems.

Processing during transport may be especially advantageous when an equiduct transport system serves a set of communities which are relatively widely spaced from each other. Thus, processing might be substantially completed during transport, before additional material was to be added to the equiduct system. Such processed material might then be released from the system in a controlled manner, or used for its byproduct value. In this way, concentrated processing at processing plants might economically be avoided.

J. Merging Tributaries

In FIG. 1a is depicted a tributary 22 of the river 1 flowing into the river 1 from some region beyond broken line 21. This tributary contains a set of equiduct transport systems 23, 24, 25, 26, and 27 corresponding to systems 3, 4, 5, 6, and 7 of river 1. To simplify the drawing, various flow augmentation and gas control stations have been omitted from the equiduct systems in tributary 22. A community 30, including a factory 33, is located near tributary 22. A suitable collection system 32 captures sewage and other effluent which otherwise would have been dumped into the tributary, and delivers it to a suitable merge unit 20, where it enters the equiduct 27 reserved for raw sewage transport. The tributary and the contents of the equiducts all move in the direction of arrow 29.

Community 30 is also served by a suitable solid materials shredding and processing system 36, which delivers solids through a suitable merge unit 20 into the duct 24 for solids. Factory 33 is depicted as delivering noxious material through a conduit 34 and merge unit 20 into the duct 23 for noxious materials.

At location 96, tributary 22 enters river 1. All of the equiducts from the tributary 22 are merged by merging units 20 into the corresponding equiduct systems in the main river 1. Optionally, an equipod storage system, with junction means 19, flow control means 18, and equipod 28, is used in the raw sewage conduit 27. This could be used to facilitate smoothing peak loads. Note that flow augmentation means for fast flush, and/or an equipod system for peak load smoothing can be used in the collection system 32. Also note that the same merging means 20 is used within the tributary as in the main river 1. This process can be repeated as smaller tributaries merge into larger tributaries and gradually feed into the main river. Thus, this detailed illustration of the junction could be applied many times on many different scales during the course of collection of material from communities along the various waterways forming the tributaries and the main river. The liquids in the equiduct transport system and the water in river 1 flow in the direction of arrow 98, leaving FIG. 1a at the broken line 97.

Depending upon the terrain and the nature of the tributary, the tributary may deliver liquid at a substantial pressure due to gravity feed. This pressure might then be used to actuate flow augmentation means to facilitate pumping of fluid transported within the equiduct transport system in river 1. Such a use of gravitational energy is discussed in my co-pending application *1. Various flow augmentation means may be used in such a configuration. The flow augmentation function and the merging function may be combined with each other. Suitable flow control means and instrumentation are presumed incorporated in the merging stations to allow the proper merging of material from the tributary with material transported in the river.

K. Minimizing Modifications of Municipal Systems

An important advantage of the equiduct system described above is that its use requires only minor modifications of the existing sewage systems of communities. Also, essentially none of the sewage and equiduct processing facilities of the invention require the use of land outside the river. There might be some exception to this if oxygen purification plants are used to extract oxygen from the air for oxygenation of material transported within the equiducts. Such oxygen plants could be located in regions where land is more readily available than in the community itself, or might be located on piers or suitable floats on the river itself. Because substantially all of the system would be submerged, and substantially no modification of privately-owned lands would be required, this configuration for a sewage collection system would offer the opportunity to avoid both aesthetic and legal complications, thus facilitating its rapid adoption and installation.

Note that where cross cables or other equipment may be located on the bottom of the river, the equiduct does not necessarily have to be located in contact with the bottom. By use of suitable fixturing means and suitable control of the buoyancy of the equiduct, both of which are discussed in more detail in my co-pending application *2, the equiduct might be located at a depth between the surface of the river and the bottom of the river, reducing interference with such other previously installed apparatus.

L. Thermal Pollution

The thermodynamic efficiency of a power plant using heat engines, such as a fuel or nuclear-powered power plant using steam engines or the equivalent, depends upon the temperature at which heat is rejected. Thus, providing substantial quantities of cooling liquid can be desirable in reducing the temperature rise in such cooling liquid, and thus reducing the temperature at which heat is rejected by the power plant, for higher thermodynamic efficiency.

In FIG. 1b is depicted a power plant 38 which normally would draw from the river cooling water into which it would reject waste heat from the power production process. When such cooling water is returned to the river, its additional heat could be said to constitute "thermal pollution" within the river. Because the thermal conductivity of sewage and water and the thermal conductivity of typical elastomeric materials from which the walls of equiducts might advantageously be constructed are relatively low, heat within a liquid transported within a relatively large diameter equiduct can be regarded as substantially contained within the equiduct. Thus, if the heated water from the power plant were transported in such an equiduct, the leakage of heat from the equiduct would be spread over such great distances and at such a low rate as to render it quite substantially more acceptable from the standpoint of the ecological balance in the river. Additionally, such heat within liquid transported within an equiduct can be beneficial in promoting biological processes by which sewage may be detoxified.

Sewage transported within the sewage equiduct 7 passes through a merge unit 20 wherein it receives sewage from another community 39 downstream from the power plant 38 and passes into processing plant 50. Processing plant 50 might, for example, advantageously contain a sorting mechanism within which relatively rapidly sinking or floating solid material in the equiduct 7 might advantageously be removed therefrom and transferred by a link 52 into a merge unit 20 into the duct 4 for solids. In this way, debris might advantageously be prevented from proceeding further within the portion of the sewage which is to be used for cooling the power plant. Sewage substantially free from debris then passes in the direction of arrow 54 through an equiduct 61 to enter the cooling water intake for plant 38. The heated effluent therefrom moves through a duct 45 in the direction of arrow 55 to enter a processing station 46. If desired, an additional branch can continue from sorter 50 as the equiduct transport system 7, carrying material which is not needed in the power plant 38, or providing overflow capacity for handling peak loads beyond the capacity of sorter 50. Sorter 50 might advantageously be of a type described in connection with FIGS. 9 through 12 or 16 through 18 of my co-pending application *4.

By using sewage as the coolant in power plant 38, and transporting the heated sewage therefrom within suitable equiduct transport means, thermal pollution from power plant 38 might readily be substantially eliminated. This warmed effluent might be carried substantial distances within equiduct transport system 7 or some other suitable equiduct transport system river 1. However, for purposes of illustration, in FIG. 1b is depicted an underwater processing plant 46 to which this warmed effluent feeds substantially directly. The plant 46 and associated equipment will be described in greater detail below.

M. Concentrating Noxious Materials

Power plant 38 might be used as a source of heat to operate a distillation process by which noxious materials might be concentrated with substantially negligible risk of carryover of noxious material from the material being concentrated to the water removed therefrom. Such a distillation process could be expected to be required to handle only a relatively small amount of fluid compared to the amounts transported within the sewage ducts. Such a concentration process could be allowed to go substantially to completion, yielding a relatively small amount of highly noxious, concentrated material which could be transported either by an equiduct or by some other means. Assuming that an equiduct would be used for such transport, conduits 104 carry the dilute liquid from the equiduct 3 to the power plant 38, and carry concentrate from the plant 38 back to the equiduct 3. Water extracted in this process could be released into the river, or transferred into duct 45 in the event that its temperature were sufficiently high so that its release into the river might present thermal pollution problems. It may also be possible to process various types of industrial waste or other noxious material transported within equiduct system 3 by biological means using suitably selected microorganisms. Also, chemical processing might be performed during the transport within the equiduct using the equiduct as an extended continuous mixing reaction vessel. For example, some heavy metals might be removed from solution by chelating agents. Biological organisms specifically tailored to concentrate heavy metals might be introduced and then removed as sludge. Such concentrations might then subsequently be more readily processed, either for reclaiming the materials extracted or their final disposition. One major advantage of a distillation process for concentrating such noxious materials is that the water removed in such a process is substantially pure and might subsequently be handled with relatively little concern for toxicity. Ultimate disposition of the materials transported in equiduct 3 might properly involve complete segregation into constituent elements so as to fully control any possible toxicity.

When factories are located along an extended river system, concentration of noxious effluents therefrom at various locations along the river could be advantageous in reducing the cost of transporting such material further downstream.

N. Upstream Flow of Wastes

Sewage is collected from community 39 by a suitable collection system 41. The sewage flows in the direction of arrow 40 opposite to the direction of flow of the river. This might be implemented by gravity feed or by suitable flow augmentation means, not shown. The collected effluent then passes through an optional gas segregation station 37 and proceeds upstream in the direction of arrow 53 past an optional flow-smoothing equipod system 95 to enter a merge unit 20, wherein it merges with sewage transported in equiduct system 7. Note that the flow of this collected sewage is upstream relative to the river. This direction of flow might be relatively advantageous for short distances where a particular purpose is to be served. In the case illustrated in FIG. 1b, several purposes would be served by such a choice of direction of transport for sewage. First, transporting this sewage upstream would allow it to be added to equiduct 7 upstream of power plant 38, allowing a greater flow of sewage through power plant 38 and allowing its thermodynamic efficiency to be higher than would be the case if a relatively restricted flow of coolant liquid were available. The second advantage is that the sewage, so warmed, could progress to a single main processing facility rather than requiring a separate processing facility located elsewhere.

The foregoing is an example of a situation in which it is relatively advantageous to transport fluid upstream within an equiduct system for a relatively short distance. Substantially longer distances of transport might be desirable in situations in which the slope of the river or its tributary is relatively slight. This, for example, might be the case in an estuary. Under some circumstances, processed or raw sewage might be transported substantial distances upstream, to deliver it to a suitable location for a processing facility, or to use it for various forms of agriculture or aquaculture. Many other variations on such a system might be implemented involving transport of fluids in both directions within a surrounding body of fluid. For example, processed sludge might be transported upstream to a suitable factory where it might be converted to fertilizer or other material. Materials to be reclaimed from the solids duct might be transported as suspended slurries by means of equiducts to locations at which they would receive further processing. Substantially fully processed effluent might be transported upstream to add fresh water to a stream above a salt incursion line, thereby reducing salt incursion in an estuary or river. Such combinations of flow patterns may be implemented using equiduct transport systems, without departing from the scope of the invention as set forth herein and in my co-pending applications *1, *2, *3 and *4.

O. A Submerged Sewage Processor Within the River

In the event that the uninterrupted run of sewage equiduct 7 below community 39 is not sufficiently great to allow processing to be substantially completed within that equiduct, a more localized processor may be desirable. Sorting system 50 can be regarded as the first step of such a processing plant. Warmed effluent from power plant 38 proceeds to the next step of processing, which occurs at the underwater location 46. At 46, the liquid is treated chemically, or has suitable biological cultures added to it, or in some other way is prepared for subsequent processing. It then progresses through duct 51 to a suitable oxygenation or aeration station 85 which is served by suitable compressor or oxygen separation means located at station 46. This could be the case if aerobic processes were desired in subsequent processing. Were anaerobic biological processes selected, such oxygenation or aeration would be unnecessary.

From oxygenation station 85, liquid enters an equiduct bed 49, at the ends of which are manifolds 47 and 48, and inlet and outlet conduits 51 and 56, respectively. Such an equiduct bed is discussed in greater detail in my co-pending application *4, with reference to FIGS. 21, 22 and 23 thereof. For specificity, we will assume that this equiduct processing bed is operated with its equiducts receiving fluid substantially in parallel through manifold 47. Thus, the flow velocity within these equiducts might relatively easily be made sufficiently small so that biological processing and sedimentation of the biological product could be substantially completed before manifold 48 is reached. Thus, outlet equiduct 56 usually carries substantially purified material which would be transferred at station 57 to merge through a merge unit 20 into the equiduct 6 for processed effluent. During this processing, sludge would tend to accumulate within equiduct processing bed 49.

A high rate of biological activity readily can be provided within the processing bed 49 because of the increased temperature created by the heating of the effluent by power plant 38. In order to support oxygenation sufficient for substantially complete biological degradation within these equiducts, the equiduct bed advantageously is located at a substantial depth within the river 1. This increases the pressures on the liquids in the conduits. This, in turn, provides a relatively high partial pressure for dissolved oxygen, greatly increasing the amount of dissolved oxygen in a given volume of liquid, and supports greatly accelerated biological processes. This is discussed in more detail in connection with FIG. 21 of my co-pending application *4. Bed 49 could be of a two-diameter type, as discussed in *4.

As has been pointed out above, increasing the temperature of the sewage can be advantageously used to increase the rate at which biological processing of the sewage takes place. Thus, locating equiduct processing bed 49 in a position suitable for receiving sewage warmed by power plant 38 allows considerable reduction in the length of time which the sewage must spend within the equiduct processing bed in order for it to be substantially purified. This, in turn, allows considerable reduction in the internal capacity of the equiduct bed and thus in its construction cost. Thus, heat rejected from power plant 38, instead of becoming thermal pollution within a river, is used advantageously in facilitating the processing of sewage. Thus, the solution to both the sewage pollution problem and thermal pollution problem might advantageously be implemented, with each contributing to solving the other.

By converting the parallel to series-parallel flow within equiduct bed 49, for example, in accordance with the flow pattern set forth in FIG. 23 of my co-pending application *4, solid material deposited in equiduct bed 49 might advantageously be re-suspended and transported therefrom as a pulse contained within a substantially smaller volume of fluid than that which had passed through in the course of depositing such material. Thus, for a small portion of the time, duct 56 would carry substantially detoxified sludge. Note that when flow is performed in the manner set forth in FIG. 23 as referenced, the time spent by sewage within the equiduct processing bed is substantially the same as that spent when it is connected in parallel. Thus, the material removed from the bed would be substantially detoxified. This sludge, removed in a pulse from equiduct bed 49, then proceeds to the processor 57. Within processor 57 is located a sorting mechanism, such as was described in connection with processing station 50, by which sediment is separated from liquid. The sludge removed at station 57 is then transferred through a link 58 to a merge unit 20, at which it is merged with other sludge transported within the sludge transport system 5. If, during the course of forming the pulse of sludge and separating it from the liquid, a portion of inadequately processed liquid is delivered at station 57, this inadequately processed liquid can be allowed to proceed through link 60 to merge unit 20 with raw sewage transport system 7, allowing it to continue further downstream for subsequent processing.

Sorter 50, station 46, oxygenator 85, equiduct bed 49, sorter 57, and the associated merge units, together form a distributed processing plant submerged in the river 1. Thus, a processing plant can be incorporated in the equiduct system relatively inexpensively and unobtrusively. This processing plant is generally designated 62. The power plant 38 or another source of waste heat can be regarded as an optional part of this sewage processing system.

Independently of this processing facility, the community 39 could be served by an additional shredding means 36 for processing solid wastes and delivering them through a duct 35 to merge at 20 with the solids transport system 4.

P. Examples of Use of Processed Effluent

In FIG. 1b, dashed line 99 schematically represents a substantial distance separating the processing plant 62 from apparatus downstream from the line 99. Within the river may be located taps connected to various of the equiduct transport systems 3, 4, 5, 6 and 7. For example, outlet taps 65 are depicted as connected to transport systems 5 and 6, carrying, respectively, detoxified, biologically-active sludge and substantially treated effluent. At merge unit 20, the substantially pure water from equiduct 6 and substantially detoxified biologically active sludge from duct 5 are merged and delivered into an equiduct 67 for delivery through suitable piping 64 in the direction of arrow 66, for use in irrigation and fertilization. For example, a forest 63, might be irrigated and fertilized by this material. By controlling the amount of sludge and the amount of relatively pure water delivered, various biological needs of such an irrigated region might be met at various times during its growing season.

Note that in the example of processing given in FIG. 1b, power plant 38 rejects waste heat into sewage. The processing of this sewage to detoxify it and purify it does not necessarily remove from it a substantial portion of the heat carried therewith. Thus, the relatively pure water in duct 6, and detoxified biologically active sludge in duct 5, might both be at a substantially higher temperature than the surrounding river water. This increased temperature might be advantageous in certain types of irrigation, by allowing the growing period to be extended and by increasing the rate at which biological organisms grow and mature. In order to regulate this amount of temperature increase, an additional inlet 100 can be provided, with flow augmentation means 14, to deliver liquid taken from the river itself into the irrigation conduit 64. Thus, the amount of nutrients and the temperature of the delivered liquid can be regulated separately. Thus, the growing season might be extended by providing higher temperature fluid through duct 64, using a relatively smaller portion of river water and a relatively higher proportion of processed effluent when the weather is relatively colder, and using a substantially smaller portion of processed effluent when the weather is relatively warm. The amount of fertilizer contributed from duct 5 might be regulated substantially independently of the temperature, allowing the amount of fertilizer delivered to be tailored to the growth requirements in region 63. Region 63 might contain a forest, or fields growing grain or growing feed for animals, or any other suitable agricultural use.

In a region where the ambient fluid is saline, the fresh water transport system discussed elsewhere herein could supply the desired cooler fresh water, through suitable taps, flow augmentation and control means, merge units, and the like, not shown in FIG. 1b.

Alternatively, taps 65 can supply a merge unit 20 which in turn supplies a distribution system 75 by which warm, nutritive material can be introduced into the river in a controlled fashion to facilitate aquaculture. In this respect, the functioning of the system would be substantially the same as in supporting agriculture, except that by controlling the rate of introduction of the material into the river, auxiliary inlet 100 would be made unnecessary.

Either agricultural or aquacultural uses for effluent reduces the amount of material transported subsequently in those equiducts tapped for such uses. Thus, such uses can be beneficial in several respects. They can provide for more effective agriculture or aquaculture, and at the same time reduce the capital equipment required for subsequent portions of the equiduct transport and processing systems and the operating costs associated therewith. For example, tapping material from the ducts could reduce the amount of pumping power required downstream.

Q. Fresh Water Transport

Suitable inlet means 69 can be provided to receive fresh water 68 from river 1. This fresh water would flow in the direction of arrow 70 through suitable flow augmentation means to enter an equiduct transport system 71. Such an equiduct transport system for fresh water might advantageously be used under circumstances in which an abundance of fresh water is available from the river and could be beneficially used elsewhere downstream therefrom. If the river feeds into an estuary and thence opens into the sea or other saline body, this inlet might advantageously be located upstream from the highest point at which salt incursion is significant. Then equiduct system 71 could be used for supplying water to communities located along the saline portion of the estuary, and to other locations along the shore of the saline body of water. Because the fresh water would be transported at a positive pressure (i.e., at a pressure above that of the ambient water), small leaks within the equiduct system would be substantially negligible in their consequence. Equiduct transport system 71 could be a parallel equiduct system, as discussed previously, or a single equiduct, depending upon the significance of temporary interruption of flow through the equiduct system and the importance of reliable operation and ease of replacement of components. A parallel system offers the advantage of being relatively less sensitive to accidental damage or sabotage compared to a single equiduct.

R. Typical System Cross-Section

At broken line 72, we can see a fairly representative cross-section for an equiduct transport system used for the management of pollution and fresh water within a river and estuary. The nature of equiduct transport systems 3, 4, 5, 6, 7, and 71 have been set forth hereinabove. They would carry respectively noxious materials, suspended solids, detoxified biologically active sludge, substantially pure effluent water, raw sewage, and fresh water. This collection, generally designated 88 in FIG. 1b, could satisfy substantially all of the requirements for pollution control and fresh water transport within a river and estuary.

Equiduct transport systems might also be combined with dams or other features for water management. When dams are unnecessary in the control of the flow of tributaries and a river, such an equiduct system might advantageously be used to substantially perform all of the pollution control and fresh water transport functions required, relatively inconspicuously and at relatively low cost.

S. Downstream End of System

In FIG. 1c is depicted an illustrative configuration for the downstream end of an equiduct system such as depicted in FIGS. 1a and 1b. The river 1, for example, turns into an estuary which starts upstream from the line 73 and ends around point 101 to point 76, where the sea begins. A sound 102 is defined by an island 75 and one shore 103.

Different equiducts within the equiduct system 88 are used in different ways and come to different ends. For example, equiduct system 71 is used to carry fresh water in the direction of arrow 105, substantially parallel to shore 103. At various locations, suitable taps 65 are used to deliver fresh water to locations on shore, for example, at location 90. Fresh water is transported substantial distances within such an equiduct system. Such transport might, for example, carry the water many hundreds of miles to regions which are semi-arid or arid from regions which contain an abundance of water. Also, availability of large quantities of fresh water near the shore might be desirable in raising the water table, allowing continued pumping from local wells without salt incursion. This could be desirable in that it could allow present water use habits to continue without requiring modification such as the introduction of a water distribution system.

T. Processed Effluent

Equiduct transport system 6 could deliver processed effluent, quite likely at a somewhat increased temperature caused by the cooling of power plants located along the river, through a conduit 110 to a region 77 in which it could be released in a controlled manner through a suitable diffusion means 78. This would be desirable in facilitating aquaculture in the region 78. Both the increased temperature and the availability of nutrients could be highly desirable in promoting the growth of food organisms there. For example, mollusks, shellfish, or other marine organisms might advantageously be grown in such an environment. The contents of equiduct transport system 6 also could be substantially free from nutrients. Thus, the valve might be primarily associated with increasing the temperature in the aquaculture region, thus allowing marine organisms to mature more rapidly.

The value of this fluid in aquaculture might be substantially increased by mixing therewith detoxified biologically active material from equiduct transport system 5. Such a use might not require all of the material transported within equiduct system 5. For this purpose, a tap 65 is shown connected to pass material through a link 109 in the direction of arrow 108 into merge unit 20. Merge 20 combines substantially pure fresh water flowing in equiduct transport system 6 with sludge brought from tap 65 through link 109 to deliver its output into equiduct transport system 110 feeding the aquaculture region. In the event that the contents of equiduct 6 were used directly, stations 65 and 20 and link 109 could be unnecessary.

U. Sludge Processing

As discussed above, some sludge might be used in aquaculture. However, depending upon the nature of the cultures transported within equiduct 5, such uses of the sludge might or might not be desirable. A suitable processing station 81 is depicted for processing material brought thereto by equiduct transport system 5. In conjunction with a floating station 81 is shown a deep processing equiduct bed 82. This could operate in much the same way as discussed for distributed submerged sewage processing station 62 with its processing equiduct bed 49.

Such sludge might previously, during its transport, have been converted by cultures of microorganisms into desired byproducts. Under such circumstances, processing plant 81 could serve to extract such byproducts from the sludge. For example, such sludge might have been converted to feed materials with high protein content. Some sludge, however, may originate sufficiently close to station 81 so as to preclude adequate processing during transport thereto. Thus, cultures might advantageously be grown in suitable equilibrium processing containers. These containers could include equipods and equiducts, especially deep processing equiduct beds within which the high ambient pressure of the surrounding liquid could be used to advantage. Details for such processing are discussed further in my co-pending application *4. Note that processing system 112, used for processing sludge from equiduct transport system 5, can be constructed so that substantially all but a small portion of it is submerged within the surrounding liquid to a depth sufficiently great to substantially avoid interference with navigation.

V. Final Processing for Raw Sewage

Equiduct transport system 7 may have a sufficient run before reaching region 76 to allow substantially complete processing to occur during transport of sewage therein. However, in the event that such processing is not satisfactorily completed, as may be the case if a large city were located directly at the mouth of the estuary, additional processing can be provided, for example, by a suitable processing facility 111. In my co-pending application *4, I discuss two broad classes of processing system which might be used here. One is depicted in FIG. 21 and generally designated 650. This includes a deep equiduct processing bed and suitable sorting and ancillary equipment for use therewith. This might be used to avoid exposure to weather, waves, and the like. For example, a suitable floating station 79 could be combined with a deep processing equiduct bed 80 in forming processing system 111. Such a floating station 79 might advantageously include means for increasing the temperature of fluid processed within bed 80. It may be desirable, for example, in the event that floating nuclear power plants are used to provide power to a city near the mouth of the estuary, to position the power plant and processing facility 111 so as to allow waste heat from the processing facility to be rejected into sewage transported within equiduct transport system 7.

In FIG. 13 of my co-pending application *4, I show a substantially floating processing system using equiponds within which aquaculture can be conducted. A cluster 77a of such equiponds is shown in FIG. 1c. Fluid feeds from processing station 79 in the direction of arrow 73 through equiduct transport system 74 to enter equipond 77 located in sound 102 and sheltered from the elements by the island 75. Thus, processing facility 111 can be regarded as including bed 80, processing station 79, equiduct transport system 74, and equipond 77. Within equipond 77 might advantageously be conducted intensive aquaculture. Submerged processing system 62 in FIG. 1b can be regarded as a stretched-out form of processing system 650 depicted in FIG. 21 of my co-pending application *4. Processing system 111 can be regarded as a combination of processing system 650, as referenced, and processing system 300 depicted in FIG. 13 of my co-pending application *4. In this combination, deep water available offshore could be used to advantage in providing high ambient pressure at the depth at which equiduct bed 80 could be located. Such submerged operation would render the system relatively insensitive to exposure to the ocean. The advantage of exposure at the surface of the water could be obtained in equiponds 77 in a sheltered region. Among such advantages, for example, would be the availability of sunlight. Sunlight could be used in promoting further growth of organisms, so as to allow more complete processing and conversion into valuable byproducts. For example, mollusks, shellfish, or other organisms might advantageously be grown in such equiponds. After processing within these equiponds had been substantially completed, the fluid processed therein could be released into sound 102, substantially in accordance with the diagram in FIG. 13 as referenced.

Biologically active detoxified solid material which is not desired for use in equiponds 77 could be transported through equiduct transport system 93 in the direction of arrow 113 and delivered to sludge processing system 112. This is an example of a way in which sludge might arrive at processing system 112 without having been transported sufficient distance within equiducts to allow substantially complete processing to byproducts.

W. Final Processing of Solids

Equiduct transport system 4 is used for transporting solid wastes in suspension. During transport of such wastes, various biological activities would be used to decompose the material transported and to produce therefrom various byproducts desired. For example, cellulosic materials can be converted into organisms from which could be extracted protein for use in feed supplements. During the transport process, various combinations of aerobic and anaerobic processing can be used as desired, and chemical processing can be performed simultaneously therewith or in sequence therewith. Thus, by the time the material transported in the duct 4 reaches processing station 83, noxious portions thereof may have been substantially removed by biological or chemical processes.

In my co-pending application *4, I discuss a variety of ways in which solid material can be separated into various constituents according to sedimentation rate and according to rate with which such material can be transported within an equiduct system. FIGS. 16 through 18 and 9 through 12 of application *4 depict separation systems using belts for sorting. An equiduct bed can be used for sorting materials according to the rate at which they can be transported within the equiduct in a fashion analogous to the use of chromatography for separating materials with different rates of migration. In FIGS. 2 through 5 of application *4, I discuss a way in which material may be segregated according to its density, rather than rate of sedimentation, using the difference in density between fresh water sewage and salt water to provide an interface upon which some material could collect. In FIG. 14, I depict diagramatically the segregation of a pulse of solids into various constituents according to rate of transport within an equiduct. An equiduct bed could be used for forming such a pulse of solids, as was discussed in connection with processor 62, and such a pulse of solids might be segregated in much the same way as is discussed in connection with FIGS. 21 through 23. Using these various sorting means, and using equiduct beds if desired, material could be sorted into various components. Processes for treating these various components are discussed in my copending application *4.

Processing techniques known in the art could be used in conjunction with such separation techniques to convert material into desirable byproducts, or to reclaim from such material metals, glass, ceramics, or other materials for recycling. Material to be disposed of, after such sorting for reclamation had been performed, might advantageously be transported through a suitable equiduct means 86 to a disposal head 87. Disposal head 87 might, for example, move around to deposit this material over a relatively wide region, so that it could sink without building up an appreciable height of debris. Debris disposed of in this way would advantageously be selected to sink within the ocean surrounding it. Fortunately, most materials which float in sewage or garbage are organic in nature, and thus treatable by biological or chemical processes, or composed of materials which could be treated by suitable chemical means, such as high pressure hydrogenation to convert them into combustible products. Such combustible products might be used for their fuel value, or might be burned directly in processing facility 83 to provide energy for use elsewhere. Alternatively, such materials might be transferred to processing facility 79 and burned there, facilitating heat rejection into sewage prior to its biological processing. If desired, disposal head 87 could be located off the edge of the continental shelf. Under such circumstances, debris which sinks in ocean water could be relatively unlikely to build up a sufficient height to be a nuisance.

Note that during transport within equiduct system 4, solids could be substantially detoxified by biological activity. In addition to removing a substantial portion of the solids transported by converting it to biological products, such processing, by reducing toxicity, could also reduce the complexity and precautions required for subsequent processing of remaining undigested solids.

X. Adding Nutrients to Facilitate Processing and Uses

Operation of various sewage or sludge processing systems such as 111 or 112 might benefit from balancing of the nutrients provided therethrough in the sewage or sludge, and their operation might be rendered more complete by incorporating missing nutrients which would allow biological processing to consume those nutrients present within the system. Such nutrients might be added at any convenient point upstream within the equiduct system, and transported to these processing locations with the fluid in the equiducts. This could advantageously provide thorough mixing of these nutrients with fluid to be processed, and could facilitate performance of such processing during transport. This is discussed in more detail in my co-pending application *4. Such transport of nutrients could also be beneficial for other uses, such as irrigation or aquaculture, and could be adjusted to fit varying needs during different parts of the growth cycle of organisms using such transported material.

Y. Energy Density in Transported Materials

Note that the energy available per unit volume in the form of biologically or chemically active material contained within the equiduct 5 readily can be made quite substantially higher than that present in raw sewage transported within system 7. Thus, such a higher energy density may favor use of the energy available within the material transported within equiduct 5 to provide energy used in processing that material, whether biologically, chemically, or physically. Maintenance of a favorable energy balance could be advantageous in simplifying subsequent processing. The same analysis applies to the transport of solid wastes within equiduct transport system 4. In both cases, conversion of the transported material to fuel becomes more economical as the energy content per unit volume of the transported substance increases. Transformation to biological products can occur at a substantially greater dilution than might be economical for transformation into fuel. Thus, a variety of different processing techniques might be appropriate according to the energy content per unit volume of the material to be processed.

Z. Noxious Materials

As indicated above, noxious materials transported within equiduct transport system 3 may be processed by suitable techniques at a station 84. Station 84 is shown located on the island 75. However, instead, the station 84 may be floated at some suitable location at sea or in the sound 102 or otherwise placed, on land, water, underground, etc. Ultimate disposition of the materials transported within equiduct system 3 depends in detail upon the nature of such materials. One form of treatment which might be generally satisfactory could be to dehydrate such materials and then heat them to high temperatures to separate them into their constituent elements. In this way, the elements might be reclaimed and recycled. However, reclamation of such elements would not be the sole objective. One substantial advantage of such treatment of noxious materials is that their full deomposition converts them into elemental substances whose properties are relatively well known by comparison to the properties of complex compounds. Thus, the safety of their final disposition might be more readily assured. As medical understanding has advanced, it has become progressively clearer that noxious materials cannot be casually disposed of. Thus, although such a decomposition process might be relatively expensive, it could offer substantial advantages in that its consequences can be clearly understood. Such a processing plant might advantageously use nuclear energy as the source of energy for heating to decomposition, and for segregating the products of such decomposition. Note that the bulk of such processing could be performed at costs roughly comparable to the costs for desalination of seawater. Only the relatively high concentrated material left after water had been removed in such a way might require subsequent decomposition into elemental form. Thus, station 84 might advantageously be combined with a nuclear power plant. Such a nuclear power plant might be floated on water or located near land, depending upon other requirements for its operation. Floating nuclear power plants are at various stages of design and construction as of this writing.

AA. Location and Stability of Equiducts

The various equiducts comprising the equiduct transport systems 88 may, under some circumstances, advantageously be located at intermediate depths between the surface and bottom of the liquid, in the estuary 101 and its mouth 76. Under such circumstances, the buoyancy of the equiduct influences the distances between anchoring or locating means along each conduit. This is discussed in more detail in my co-pending application *2, as are also discussed therewith means for controlling the positions of equiducts. Various flow augmentation, tapping, and merge stations can be provided with buoyancy or ballast means so as to allow them to achieve substantially neutral buoyancy, facilitating their placement and maintenance in position. Typically, the fluid transported within these equiducts would be less dense than the ambient fluid. This would be because the sewage would be substantially fresh water in nature, while the surrounding fluid would be salt water. To achieve a net neutral buoyancy, the walls of the equiduct can be constructed of suitable materials to bring the net buoyancy of the equiduct to the desired range. This is discussed in detail in my co-pending application *2.

In the event that biological activity occurs within these equiducts, as is likely to be the case during the transport and processing of sewage, such activity may give rise to dissolved gases within the fluid in the equiduct. Such dissolved gases may advantageously be controlled, for example, by locating the equiduct at a suitable depth, so that the partial pressure of the gases does not exceed the total fluid pressure within the equiduct. Also, suitable gas segregation and gas introduction stations can be incorporated into the equiduct system, as discussed previously in connection with stations 14 located in region 91 of the river 1. Control of partial pressure of such dissolved gas can be significant in avoiding undesirable changes in the buoyancy of the equiducts. A gaseous phase present within a submerged equiduct could act in a way which might tend to destabilize the buoyancy of the equiduct, making it relatively more difficult to fix it at a desired position within the surrounding fluid. This problem of dynamic stability and gas phase in equiducts is discussed in more detail in my co-pending application *2. Means for controlling such gaseous phase are discussed in my co-pending application *1.

Special consideration might be given to the duct or ducts 4 carrying slurry. Such ducts might be exposed to substantial abrasive wear on their inner surfaces. Thus, in order to maintain control of the buoyancy of such a duct, its inner liner might advantageously be constructed of a material having substantially the same density as the mean density of the fluid and solids transported therein. Thus, progressive wear and removal of this inner liner would not substantially alter the net buoyancy of the equiduct plus contents. In order to distribute this wear more evenly, the equiducts used for transporting such slurry might advantageously be positioned by devices which permit the equiduct to be rotated occasionally. Thus, such wear, insofar as it was made assymetric by the action of gravity, curves, and the like, might be rendered more nearly symmetric by such occasional rotation of the duct. This could prolong the operating life of the equiduct.

The net buoyancy of equiducts used in equiduct transport system 4 depends upon the mean density of slurry transported therewithin. Thus, it may be advantageous to be able to provide controlled dilution of this slurry, so as to control the net buoyancy of the equiducts. This could be especially advantageous when different amounts of solids are transported at different times. Such controlled dilution may also be advantageous in maintaining sufficient velocity so that sedimentation does not occur within the solids transport equiducts. This could be especially significant when substantially netural net buoyancy is desirable. Such substantially netural net buoyancy can be advantageous, for economic and technical reasons discussed in my co-pending application *2.

Within an estuary, the salinity of the ambient fluid may depend upon tides, as fresh water and salt water mix in different amounts. Under such circumstances, it may be especially advantageous to place the equiducts in such a way that the range of change in net buoyancy expected does not affect their position appreciably. This could be especially significant where at least a minimum operating depth was desirable in order to retain in solution gases at high partial pressure within the fluid within the equiduct. Considerations of changing buoyancy, changing ambient fluid density, and the effects of gases in solution are discussed in more detail in my co-pending application *2, together with apparatus and methods to provide for effective, stable operation of equiducts under such circumstances.

BB. Stability of Equiponds

The nature of equiponds is discussed in more detail in my co-pending application *4. The stability of such equiponds depends upon the relative density of contained fluids and surrounding fluids, and upon the nature of sedimentation processes which can occur within the equiponds. One consequence of these considerations of dynamic stability in the presence of sedimentation is that the density of sediment can advantageously be restricted so as not to have too dense a sediment settling upon the bottom of the equiponds. Thus, processing station 79 of processing system 111 is presented with an operating constraint as to the maximum density of sediment which can advantageously be transported through equiduct 74 to equipond 77. These considerations are analyzed in considerable detail in my co-pending application *4, in connection with FIGS. 1, 6, 7 and 8, and this detailed analysis will not be repeated here.

Where appropriate, additional inlet ports with suitable flow control or augmentation means might advantageously be situated so as to receive discharges from marine vessels, allowing these discharges to enter directly into the equiduct transport system, feeding into an equiduct appropriate to the nature of the material being discharged. In this way, such discharges might be accomodated without introducing water pollution. In FIG. 1c, station 120 could be used for such purposes, receiving discharges from marine vessels which would feed through flow augmentation means 14 to enter equiduct transport system 7, feeding into processing system 111 together with sewage already flowing within the transport system. In the event that the material being discharged were a noxious material, it might instead feed into equiduct transport system 3. Other connections might be made, or multiple connections might be made available at a single station, so as to service a wide variety of discharges.

VII. EQUIDUCT SYSTEMS ENDING IN LAKES

Suppose that instead of terminating in an ocean, equiduct transport system equiducts 88 deliver their contents to processing facilities located in a lake. In that case, substantially all of the processing described in connection with FIG. 1c could occur with only relatively slight modification. Possibly with depth depending on topography, deep processing beds 80 and 82 could still be able to function effectively, as could their associated processing plants. Equipond 77 could advantageously be modified to assure its dynamic stability in a fresh water medium. This is discussed in more detail in my co-pending application *4. Fresh water transport equiduct system 71 might be omitted under such circumstances. A disposal head 87 might be constructed in such a way as to allow it to roam over substantial portions of the surface of the lake, allowing insoluble detoxified debris to be placed into the lake in a relatively inocuous manner. Note that much of the solid wastes introduced into equiduct transport system 4 could be digested or chemically processed therein. Subsequently, a substantial portion of the undigested material could be sorted for reclamation. Thus, the amount of solid material which would be disposed of through head 87 might be quite small by comparison to the amount of material disposed of by the cities into the equiduct system. Depending upon the processing occurring in plant 83, equiduct 86 and disposal head 87 might be unnecessary. Aquaculture could be performed within lakes instead of within sound 102. Also, extensive equiponds might be used for highly concentrated aquaculture of specially selected organisms. As is discussed in more detail in my co-pending application *4, a deep processing equiduct bed, with its high level of oxygenation and increased temperature, might provide an almost ideal growth environment for aquatic organisms reaching relatively far up a food pyramid. Thus, such organisms might themselves be a usable byproduct. Thus, aquaculture processes could occur both inside and outside an equilibrium conduit and containment system. Suitably warmed effluent, transported within equiduct transport system 6, might be distributed for irrigation of agriculture around the lake region. This could provide the advantages discussed previously with respect to length of growing season and fertilization of plants. As discussed previously, a portion of sludge from equiduct transport system 5 could be added to fluid from equiduct system 6 to provide a mixture for irrigation and fertilization. Also, as discussed previously, temperature of such a mixture can be controlled by adding various amounts of fresh water. In this case, such fresh water might advantageously be derived from the lake within which the equiducts were located.

Buoyancy and dynamic stability conditions on positioning the equiducts could be relatively simpler in the case of a lake than in the case of an estuary with changing salinity, because the density of the surrounding fluid would be substantially constant.

Thus, with relatively minor modification, the equiduct transport system for controlling pollution in rivers and estuaries might be readily adapted to controlling pollution in rivers which feed into lakes, or delivered into lakes directly by communities.

VIII. CLEANING OUT A WATERWAY

A variety of specialized devices might be used in conjunction with an existing equiduct transport system to facilitate cleaning out a contaminated waterway. For example, suitable dredges or siphon systems might be used to clean sludge from the bottom of a river. This sludge could then be fed into a suitable equiduct transport system such as 4 or 5 in FIG. 1a, or possible 7, depending upon the nature of the material dredged. In creeks or other tributaries, a clawed vehicle for tearing up from the bottom debris which had settled there and delivering it into an equiduct system might be advantageous in speeding the removal of solid debris dumped into the creek or tributary. In the case of a river, such debris might more effectively be removed by dredging and siphoning.

During periods of heavy runoff, such as during spring thaws or following a heavy storm, sludge might be raised from the bottom of a river by introducing large quantities of air, such as might be obtained by bleeding air from the compressor of a large turbojet engine. Such an engine system might advantageously be carried on a barge or other suitable vehicle, and gasses percolated into the bottom sludge, raising it to allow it to run off during a fast runoff period. Such a cleanup process might advantageously start near the upper reaches of a river and its tributaries and progress downstream. Thus, the upper portions of the river might become substantially free of pollution earlier than might otherwise be the case. Freeing the upper reaches of pollution could, in turn, reduce pollution entering regions further downstream, allowing them to be freed of pollution earlier than might otherwise be the case. Augmentation of the cleanout process might be desirable in speeding the rate at which the river might be restored to a healthy ecological balance.

IX. SIMPLIFICATIONS AND DETAILS

FIGS. 1a, 1b and 1c contain a greatly simplified illustration of an equiduct transport system for control of pollution and transport of fresh water. Many details have been omitted for clarity. These details are set forth in my co-pending applications *1, *2, *3 and *4. The details of fabrication, installation, instrumentation, and operation of such equiduct transport systems are set forth in these co-pending applications. Also, in those applications are presented a wider variety of ways of achieving the objectives illustrated in FIGS. 1a, b and c than have been disclosed herein. For example, in my co-pending application *4, I set forth several different ways in which processing of sewage may be implemented using fluid equilibrium containment. Included therein, among others, are separation and processing systems using equipods, equiponds, and deep processing equiduct beds. Various ways of using light in promotion aquaculture within such equilibrium fluid containment systems are also set forth therein, as are various considerations regarding the ways in which such systems may be combined and implemented. It is to be understood that many different combinations may be made among various system components without departing from the scope of the invention as set forth herein.

X. ELECTRICAL SYSTEMS AND INSTRUMENTATION

In my co-pending application *1, I discuss ways in which flow augmentation might advantageously be implemented. Some of these ways involve the use of electrical power. Suitable electrical distribution systems involving underwater cables are within the art of underwater electrical distribution as currently practiced. Improvements in that art might be incorporated as available. However, existing technology would be sufficient to allow electrical distribution to the various flow augmentation means, using underwater cable where appropriate and overload cable where necessary. Generally, use of underwater cable running in parallel with, and possible affixed to, the equiducts of the transport systems would be preferable. Such use of underwater cable would make the power distribution system substantially as inconspicuous and innocuous as the sewage collection system. Similarly, such location of power distribution could avoid problems of acquiring right of way and aesthetic difficulties, which might be associated with overland or buried cable. Means of affixing such cable to equiducts is discussed in my co-pending application *2.

In my co-pending application *3, I set forth ways in which instrumentation might be implemented for use in conjunction with an equiduct system. Also, I set forth therein ways in which such instrumentation might deliver its information to a central location. The art of construction and operation of submerged signal carrying cables has been developed to a level sufficient to allow implementation of such information gathering by means of submerged systems running in parallel with, and possibly affixed to, the equiducts themselves.

Ways for detecting electrical leaks and incipient failure of housings used for electrical equipment are discussed in my co-pending application *3. These detailed discussions will not be repeated here.

XI. OPERATING ALGORITHMS

An extensive system of interconnected components comprising a pollution control or water transport system might advantageously benefit from control from a location at which information on the status and function of each of the portions of the system were available. For purposes of discussing operation of such an extended system, I will assume that instrumentation as appropriate has been installed, and the information therefrom gathered to a central processing location, wherein it can be used for implementing the control of such a system. Control signals would then be transmitted from such a central location to modify or control the operation of various components of the equiduct system. Because of the intricacy of operation of such a system, I will discuss briefly here some of the rules of operation, or operating algorithms, which can be used advantageously in implementing such centralized control. The various types of instrumentation required to provide the measurements referenced in this section are discussed in more detail in my co-pending application *3, and such detailed discussion will not be repeated herein.

Operation of a large-scale equiduct system such as is depicted schematically in FIGS. 1a, b and c involves a large variety of interrelated effects, including considerations of physical, biological, ecological, chemical, engineering and economic effects. These operating considerations interact with the design and details of the physical system used to implement the collection and processing of sewage and the transport of fresh water. In order to facilitate the practice of the invention as set forth herein and in my co-pending applications *1, *2, *3, and *4, I will list below classes of effects which may advantageously be taken into consideration in designing the operating algorithms for such an extended system. To clarify the interrelationships among various types of effects in connection with specific effects mentioned below, I will also mention some cross-effects among various classes, such as combined physical, chemical, and biological effects.

A. Physical Effects

1. Fluid Flow and Pressure.

The flow of fluid among the various branches of an equiduct system obeys the conservation laws interrelating flow energy and pressure. The total cross-sectional area of duct available can be made to vary over a substantial range. Decreasing the cross-section increases the flow velocity required to transport the same volume of fluid per unit time. Consequently, the kinetic energy carried with the fluid increases. If no additional energy is made available within the system, the pressure of the fluid decreases, corresponding to the conservation of energy. To maintain a relatively higher flow velocity, so as to transport the same volume through a smaller cross-section of duct, more pumping power would be required than with a larger cross-section. Thus, the energy consumption for fluid transport can be influenced by the choice of operating cross-section for a multiple-branch equiduct transport system. This operating energy must be considered in the overall economics of the operation of the system.

The flow velocity influences the time spent within the transport system by biologically active material. Thus, the amount of time available for biological processing of biologically active materials, such as sewage, sludge, solids, or the like, can be influenced by the choice of flow velocity. This degree of biological processing available then interacts with the amount of processing required in additional plant capacity, if any. This could influence the choice of biological organisms used in the processing.

Transport of suspended material within an equiduct can give rise to wear of the inner lining. This wear, in turn, affects the preventive maintenance required for continued operation of the equiduct system. Simultaneously, the choice of flow velocity in order to retain material in suspension within the fluid affects the pumping power required and the time available for biological or chemical processing during transport.

The momentum of the fluid flowing within the equiduct system affects the rate at which flow can be diverted from one portion of an equiduct system to another. Rapid diversion could have associated therewith substantially rapid changes in momentum of the flowing liquid, which could, in turn, give rise to substantial pressures within the system. Thus, rates of change of operating parameters in the system can directly influence other operating parameters. Thus, it would be highly desirable to include all such operating parameters, describing the physical flow, rates of change, momentum, pressure, frictional drag, and the like, within the system in a model which would simulate the effects of any such changes so as to allow them to be implemented in a way which keeps the operating parameters of the system within their design limits. Numerical simulation of the physical parameters of the system could be highly advantageous in implementing such a simulation substantially in real time for control purposes.

2. Buoyancy

The buoyancy of equiducts transporting suspended solids might advantageously be controlled to maintain substantially neutral net buoyance in the event that such an equiduct was utilized at a depth intermediate between the surface and bottom of a surrounding body of fluid. This, of course, could depend upon the means by which the equiduct were located at this positions. Such means are discussed in more detail in my co-pending application *2. In the event that the suspended debris were relatively more dense than sewage, such control might be implemented by blending additional less dense sewage or other material into the equiduct carrying suspended debris, thus reducing its density. Maintenance and stabilization of such densities could be part of the operating algorithms for detailed control of flow and blending within the equiduct transport system.

3. Temperature, Dissolved Gases, Pressure, and Their Effects on Buoyancy

Temperature of the liquid within an equiduct can affect its ability to hold dissolved gases for a given partial pressure. If the temperature were to change substantially, the changes in temperature could affect the choice of maximum allowable dissolved gases which could be included within the equiduct without giving rise to a gaseous phase therein. In my co-pending application *2, I discuss effects of such dissolved and evolved gases upon the buoyancy, and stability of buoyancy, of an equiduct.

Rate of biological activity within an equiduct can depend both upon the temperature within the equiduct and upon the amount of dissolved gases within the fluid therein. Such biological activity may, in turn, give rise to dissolved gases which, if their partial pressure becomes high enough, could evolve into a gaseous phase. Thus, thermal effects on biological activity can influence the evolution of a gaseous phase, and thereby the dynamic stability of the buoyancy of the equiduct. The depth at which the equiduct is situated can influence the ability to retain dissolved gases in solution by influencing the partial pressure which can be supported.

4. Flow, Pressure, and Dynamic Stability of Equiducts

In my co-pending application *2, I discuss in considerable detail surface wave effects which can arise when flow within an equiduct and the pressure within an equiduct bear various relationships to each other and to the characteristics of the equiduct wall. A broad class of such effects can arise, characterized by the propagation or damping of surface waves upon the equiduct. These surface waves of the equiduct wall could, under some circumstances, shorten the operating life of the equiduct or increase the pumping power required to transport fluid therethrough. Proper operation avoids undesirable surface wave effects, and operating ranges for flow and pressure interacts with each other and with design of the system. The discussion of these effects in my copending application *2 is quite detailed, and this detailed discussion will not be repeated here. It can be quite important to take into account these physical effects of surface waves and other dynamic effects for fluid flow within an equiduct in providing for proper operation of an equiduct transport system. This can have economic effects by influencing the life of the system, the amount of pumping power required, and the capacity of the system for transporting fluid.

B. Biological Effects

Under some circumstances, treatment of sewage might advantageously be implemented during transport of such sewage within an equiduct system. Suitable choice of organisms and operating conditions could lead to substantially complete processing of sewage during transport under many circumstances. Such processing could be economically quite advantageous, by substantially reducing the amount of plant capital required for sewage treatment.

Special biological organisms may give rise to byproducts which could interact with other materials transported within the equiduct, so as to lead to various chemical compounds or byproducts. This could be significant economically in that such byproducts might be of commercial value. Additionally, such products of biological activity ought properly be taken into account in assuring the compatibility of biological cultures with materials of construction of the equiduct system. Special organisms may be desirable for processing various industrial wastes. Some organisms may be used, for example, to concentrate heavy metals so as to facilitate their reclamation. Other organisms might be used to break down relatively stable compounds which might not be affected by cultures of organisms of a type used for treating ordinary sewage.

Biological organisms used for treating biologically active sludge might advantageously be selected to allow operation under substantial partial pressure of dissolved gases. In this way, the interval between gas handling stations in an equiduct used to both transport and process such biologically active sludge might advantageously be increased. This could result both in capital savings and in operating savings. Such cultures might also be tailored to produce specific products desired, again with a view to compatibility with materials of construction. Under some circumstances, the availability of an extensive and adequately controlled culture medium might be highly advantageous in culturing microorganisms which yield relatively small quantities of valuable compounds, such as pharmaceuticals. At different times, the same equiduct system might advantageously be used for culturing different organisms, some of which might require aerobic and other anaerobic culture media. Thus, the choice of physical conditions, such as oxygen concentration in solution, might be dependent on biological requirements. These biological requirements. These biological requirements, in turn, might depend upon temperature, materials being processed, time available for processing, and many other variables.

C. Chemical Effects

Chemical effects could change the temperature, rate of biological activity, nature of fluid contained within an equiduct, partial pressure of dissolved gas, evolution of gaseous phase, viscosity, rate of sedimentation of suspended material, etc. within an equiduct. Use of an equiduct as an extended reaction vessel, within which substantially reacted material was advantageously separated from less reacted material by flow along the duct, unlike vat processing, could allow many chemical processes to be implemented in a relatively simple manner. These processes might be desirable in the treatment of sewage, sludge, solid wastes, or industrial wastes, or in the final polishing of processed effluent preparatory to high grade uses. Various chelating agents might be used to remove heavy metals from solution in the noxious materials transport equiduct system.

Chemical pretreatment might advantageously be used to detoxify noxious materials to the point where they could be subsequently processed by biological activity.

Use of chemical agents to promote clumping and sedimentation of biological organisms after they have performed their desired processing functions might facilitate purification of effluent, for example, in submerged equiduct beds. This could reduce the capital plant required to satisfactorily perform such purification. Addition of viscosity reducing agents could reduce pumping power or increase capacity; anti-foam agents might help gas segregation; dispersing agents could reduce velocity required to suspend particulate matter, swamp pumping power; etc. Thus, in a variety of ways, choice of chemical additives or other chemical processing for use within an equiduct system might substantially influence the economics of its construction and operation.

D. Engineering

1. Maintenance and Repair.

In my co-pending application *3, I set forth ways in which leaks can be located advantageously within extended equiduct transport systems. For example, among the methods set forth is the use of chemical tracers within an equiduct whose contents were undesirable in the surrounding medium. Such a chemical tracer might advantageously be selected to be relatively easily identified, so as to facilitate locating relatively small leaks. A second class of methods set forth for locating leaks would allow their location from substantially remote stations using electrical and electromagnetic effects. These are set forth in detail in my co-pending application *3, and this detailed discussion will not be repeated here.

Operation of flow augmentation means, valves, and related devices might advantageously be analyzed by monitoring flows and pressures within the equiduct system. This information could then be used to determine the efficacy of these various devices for augmenting or controlling flow. This, in turn, could identify inadequacies in operating, to localize faults within a system.

2. Preventive Maintenance.

Many types of incipient failure of an equiduct transport system and its ancillary equipment might advantageously be detected in advance, to allow preventive maintenance. Flow augmentation means within the system advantageously can be monitored for temperature, electrical leakage if electrical actuation is used, bearing temperature rise, associated control circuitry temperature rise, etc.

Equiduct walls can be instrumented to identify and characterize any surface waves present upon the surface of the equiduct, creep of the equiduct wall, wall fatigue, or other properties which might indicate incipient failure or otherwise be useful for identifying locations at which preventive maintenance or replacement might be advantageous.

Note that with the design of system set forth herein and in my co-pending applications *1, *2, *3 and *4, each of many portions of the system may fail without interrupting or substantially degrading the overall performance of the system. For example, in my co-pending application *1, I set forth conditions appropriate for a safely flow augmented equiduct system. In such a system, failure of a flow augmentation means would not necessarily interrupt the transport of fluid within the equiduct. This is set forth in more detail in my co-pending application *1, and this description will not be repeated here.

Wear of equiduct walls might be measured, for example as set forth in my co-pending application *3. This would be an especially significant measurement for equiducts used to transport suspended material and subject to substantial abrasion thereby.

Clearly, the various aspects of repair and preventive maintenance substantially influence the economics of system operation. Choice of operating parameters so as to minimize wear would, in a practical system, desirably be made in a context of biological, sedimentation, chemical, or other requirements for the overall operation of the system. Thus, the engineering choices available during system operation interact with choices of operating points associated with other effects within the system. All of these might advantageously be combined in choosing economical operating conditions for the overall equiduct system.

E. Economics of Operation and Construction

The economics of operation of an equiduct transport system depend upon many variables, some of which are mentioned in the preceding portions of the discussion of operating algorithms. Among such variables are pumping energy, spacings with which flow augmentation stations are districted within the system, gas handling stations, nature of construction of equiduct walls, and many other detailed variables which interact with the physical, biological, chemical, engineering, and ecological aspects of the system. Under many circumstances, the economics of operating the system could advantageously be construed to include aesthetic values as well as monetary values. Although it might be relatively difficult to assign corresponding economic values for purposes of overall system optimization, aesthetic values ought properly play an important role in choosing the nature of installations, their location, and the way in which they are used.

Specific examples of economic choices can be seen in the safety margins which might be incorporated into an equiduct transport system for handling peak loads. For example, such capacity might be incorporated by constructing equiducts with walls capable of withstanding substantially higher pressures than anticipated during normal operation. Then, additional flow might be implemented by providing suitable additional driving pressure. Alternatively, an equiduct system might be constructed with substantially greater cross section than required for normal flow. Under such circumstances, the additional costs of constructing additional cross sectional area of equiduct might be offset by the slower flow velocity and lower pumping requirements during normal operation. Additionally, such additional cross section for flow could allow the flow to proceed at a sufficiently slower rate so as to allow biological processing of biologically active material to be more substantially completed during transport, reducing the capital costs of, or making superfluous, additional processing plants. Sedimentation which occurred during such biological activity and slow transport might be removed from the system by fast flushing, with additional pumping power being required for only a relatively small fraction of the time. Such implementation might correspond substantially to the detailed description set forth in connection with operation of equiduct processing beds in my co-pending application *4. The detailed distinction between transport and processing with an equiduct system is lost, in that processing and transport can occur simultaneously. Thus, economic considerations might give rise to selection of distributed processing of sewage or other material transported, under some circumstances, and relatively localized processing under others. Both cases are illustrated in FIGS. 1a, 1b and 1c.

Choice of suitable biological organisms for processing of biologically active material could substantially affect the details of construction and operation of the system, and thus the economics of such construction and operation. For example, when an equiduct could be located at a substantial depth within a surrounding body of liquid, high partial pressures of dissolved oxygen might advantageously be used therein, to allow substantial biological activity to occur without requiring that gas segregation and oxygenation stations be spaced as closely as if the equiduct were located at a smaller depth within the surrounding liquid. However, it may be desirable to have specially cultured microorganisms to take fullest advantage of such special operating conditions. Thus, biological engineering could interact with physical and chemical engineering in choosing the operating conditions for an equiduct transport and processing system. The economics of operation of such a system could then depend not only upon the costs of construction, but also upon the investment made in suitable biological research and biological engineering to improve the effectiveness with which microorganisms could perform desired biological functions within the special environments available within equiduct transport systems.

Similarly, the research and development of effective operating algorithms for an extended equiduct system could allow construction of an equiduct system utilizing simpler hardware, or having smaller overcapacity, while still allowing peak loads to be satisfactorily handled.

Construction of the equiduct system might thus properly be regarded as including not only the construction of the hardware used in the physical system itself, but also of the biological organisms and biological systems used within the equiduct system to perform processing therein, and the development of suitable system operating algorithms to effectively implement and control the operation of the system and provide good information for efficient preventive maintenance. These three factors can be regarded together as construction costs, in that they could advantageously be allowed to interact with each other in the choice of the physical plant used to implement the equiduct system.

F. Ecological Effects

An extended equiduct transport and processing system, such as that depicted schematically in FIGS. 1a, 1b, and 1c, can be regarded as an ecological system in itself, which, in turn, is embedded in a large ecological system. The overriding considerations for the choice of operation and construction of such an equiduct system might well be its overall ecological effects. It is relatively difficult at present to assign economic value to the ecological consequences of such an equiduct system. However, by cleaning up naturally occurring waterways and improving the quality of life for organisms thereon, including fish, and including people living in communities adjacent thereto, such ecological effects could give rise to profound and far-reaching economic and social benefits. Such benefits ought properly be considered in the overall evaluation of the economics of such a system.

This concept of an ecological system within an ecological system could allow study and manipulation of the smaller ecological system within the equiduct system so as to most effectively allow it to be integrated into the larger ecological system of our world. For example, the use of cultures within an equiduct transport system as the base of a food pyramid to provide nutrients for higher organisms, such as feed for animals or possibly for man, could allow a substantial portion of the biological material within such equiducts to be reintegrated into the larger ecosystem. Use of processed effluent in irrigation and in fertilization, and use of biologically active material in controlled fertilization both for agriculture and aquaculture, also offer ways in which the smaller ecosystem might be integrated into the larger ecosystem.

Operating algorithms for the smaller ecosystem ought properly be designed to include the integration of the smaller ecosystem with the larger ecosystem as a component of the modeling of the performance of the overall ecological system within the equiduct transport system. Thus, the operation of the equiduct system might be integrated into the surrounding ecosystem, to provide for minimal unintentional disturbance of the surrounding ecosystem, and maximum benefits where intentional control of the larger ecosystem by effects within the smaller ecosystem might be feasible, so as to derive the greatest benefits therefrom. Many tradeoffs could arise within selection of such benefits and operating conditions which could involve ecological, social, and economic choices. Thus, thorough and effective analysis of the operation of the ecosystem contained within the equiduct transport and processing system, and its integration with the larger ecosystem within which it is embedded, could be highly advantageous in constructing operating algorithms to facilitate operation of the system and evaluation of changes in configuration or operation therein.

G. Closing Ecological Cycles

In a fundamental sense, pollution control systems of the type set forth herein could be viewed as a substantial step towards the controlled closing of the ecological cycles of the larger system of our world. To a large extent, it is failure to close these cycles, that leads to that environmental disruption called pollution.

XII. SUMMARY

In this patent application, I have set forth methods and systems whereby pollution can be controlled advantageously in bodies of water, using as an illustration thereof a system whereby water pollution can be controlled in a river, its tributaries, its estuary, and the ocean into which the river empties. I also have disclosed such a system in use in a river and its tributaries, a lake into which the river empties. These systems use, in combination, methods and apparatus set forth in my co-pending applications *1, *2, *3, and *4, based upon the principles of fluid equilibrium and methods and apparatus for use therewith.

I have also set forth herein an advantageous system whereby fresh water may be transported within a surrounding liquid. This transport system is based upon apparatus and methods using fluid equilibrium as set forth in my co-pending applications *1, *2, and *3.

These classes of systems offer many important advantages over alternative techniques whereby water pollution may be controlled and fresh water distributed. Among these advantages are ease of installation, unobtrusiveness of apparatus, simplification of legal requirements associated with use of publicly owned, centrally located waterways, flexibility of use and installation, and high degree of efficacy.

Using systems of this class for water pollution control, rivers and other natural bodies of water might rapidly be brought to a state in which they are substantially free of four principal forms of pollution: noxious industrial wastes, solids, sewage, and thermal pollution.

I have also set forth herein, to facilitate the use of this invention, considerations for organizing the operation of extensive systems based upon the principles set forth herein.

Numerous other combinations and implementations comprising such equilibrium transport systems and processing systems may occur to those skilled in the art, without departing from the scope of the invention as set forth herein. For example, although the invention is described as being used in a large navigable river such as the Hudson river, or in tributaries of such a river, it should be understood that the invention is usable in many types of bodies of water, including water arteries such as rivers, streams, creeks and canals, as well as in lakes, oceans and similar bodies of water, whether or not they are navigable.

I claim:

1. A liquid transport system for disposing of liquid waste from the land adjacent an inland water artery having a naturally sloping bed, said system comprising at least one flexible wall main conduit beneath the surface of the artery and extending in the direction of water flow along said artery, the liquid waste inside said conduit being in fluid equilibrium with the fluid outside; a plurality of liquid inlet conduits for conveying liquids into said main conduit from positions spaced along said artery, said artery emptying into a larger body of water, merge means for coupling said inlet conduits with said main conduit for feeding said liquid wastes into said main conduit at a plurality of locations therealong; pump means for safely augmenting the flow of liquid waste in said main conduit towards said larger body of water said pump means including flow augmentation means within said main conduit to augment safely the flow of said liquid wastes in one direction along through said main conduit without causing substantial departure from said pressure equilibrium for achieving dynamic stability of the flow of said liquid wastes through said conduit, and said flow augmentation means including means permitting flow of said liquid wastes therepast in the event of operating failures of said flow augmentation means; and disposal means located in said larger body of water for receiving and disposing of the liquid waste from said main conduit: the disposal means including a submerged processing plant submerged beneath the surface of said body of water and having means for carrying out treatment of said liquid wastes while said wastes are at fluid equilibrium with the larger water body and having an inlet thereof connected to an outlet of said main conduit.

2. A liquid transport system according to claim 1, wherein said wastes include bio-degradable wastes, and said main conduit includes means within it for biologically decomposing said liquid wastes while said wastes are being transported along said main conduit.

3. A liquid transport system according to claim 1 including means for conducting said wastes through a waste heat producing structure to absorb and remove the waste heat from said waste heat producing structure, and for then conducting the heated wastes back into said conduit for transport and disposal.

4. A liquid transport system according to claim 1, wherein said main conduit has a flexible peripheral wall and includes means for avoiding wave amplification in said peripheral wall during the transport of said liquid wastes within said main conduit, while the liquid wastes within said conduit are substantially in fluid equilibrium with the water of said water artery.

5. A system according to claim 1 wherein said at least one main conduit includes a plurality of dynamically stable, parallel, flexible-wall equiducts each of which carries a type of liquid waste different from that carried by at least one other of the equiducts.

6. A system as in claim 1 including means for controlling the buoyancy of said conduit to maintain it adjacent said bed.

7. A system as in claim 1, including means for comminuting solid wastes, mixing them with a liquid, and conducting the mxiture into the conduit, which conduit conducts said mixture through said inland artery of water.

* * * * *